(12) United States Patent
Waters

(10) Patent No.: US 8,516,244 B2
(45) Date of Patent: Aug. 20, 2013

(54) SYSTEM, APPARATUS AND METHOD FOR DECENTRALIZING ATTRIBUTE-BASED ENCRYPTION INFORMATION

(75) Inventor: Brent Richard Waters, Austin, TX (US)

(73) Assignee: Zeutro LLC, Austin, TX (US)

( * ) Notice: Subject to any disclaimer, the term of this patent is extended or adjusted under 35 U.S.C. 154(b) by 8 days.

(21) Appl. No.: 13/352,735

(22) Filed: Jan. 18, 2012

(65) Prior Publication Data

US 2012/0314854 A1   Dec. 13, 2012

Related U.S. Application Data

(60) Provisional application No. 61/495,735, filed on Jun. 10, 2011.

(51) Int. Cl.
*H04L 9/00* (2006.01)
*H04L 9/32* (2006.01)

(52) U.S. Cl.
USPC .............................. 713/155; 713/189; 726/1

(58) Field of Classification Search
USPC ....... 726/1–6, 10, 27–30; 713/150, 154–156, 713/170, 173; 380/277, 28
See application file for complete search history.

(56) References Cited

U.S. PATENT DOCUMENTS

| | | | | |
|---|---|---|---|---|
| 6,092,201 | A * | 7/2000 | Turnbull et al. | 726/4 |
| 6,256,741 | B1 * | 7/2001 | Stubblebine | 726/10 |
| 7,984,479 | B2 * | 7/2011 | Brabson et al. | 726/1 |
| 2010/0185861 | A1 | 7/2010 | Chase et al. | |

OTHER PUBLICATIONS

Abdalla, Michel, et al,, "Searchable Encryption Revisited: Consistency Properties, Relation to Anonymous IBE, and Extensions", Journal of Cryptology, International Association for Cryptologic Research 2007, pp. 350-391.

Abdalla, Michel, et al., "Generalized Key Delegation for Hierarchical Identity-Based Encryption", Computer Security—ESORICS 2007, Lecture Notes in Computer Science, 2007, vol. 4734/2007, pp. 1-18.

Al-Riyami, S.S., et al., "Escrow-Free Encryption Supporting Cryptographic Workflow", Inf. Secur. 2006, 5(4), pp. 217-229.

Bagga, Walid, et al., "Policy-Based Encryption Schemes from Bilinear Pairings (Fast Abstract)", ASIACCS'06, Mar. 21-24, 2006, Taipei, Taiwan, p. 368.

Bethencourt, John, et al., "Ciphertext-Policy Attribute-Based Encryption", Proceedings of the 2007 IEEE Symposium o Security and Privacy, IEEE Computer Society Washington, DC, 2007, pp. 1-15.

(Continued)

*Primary Examiner* — Hosuk Song
(74) *Attorney, Agent, or Firm* — CipherLaw

(57) ABSTRACT

A method for secure transmission of a message encrypted under an attribute based encryption scheme is provided. A first and a second authority parameter may be received from one or more authorities. A policy is generated based on the parameters. The generated policy comprises a flexible access control structure. A ciphertext is constructed based on the policy. To decrypt the ciphertext, key components are received from one or more authorities, the key components associated with a decryptor identifier. A decryption key is generated based on the policy and the key components. A plaintext is generated by decrypting the ciphertext.

12 Claims, 14 Drawing Sheets

(56) References Cited

OTHER PUBLICATIONS

Boneh, Dan, et al., "Efficient Selective Identity-Based Encryption Without Random Oracles", In Proceedings of the International Conference on Advances in Cryptology, (EUROCRYPT '04), Lecture Notes in Computer Science, Springer Verlag, 2004, pp. 1-33.
Boneh, Dan, et al., "Secure Identity Based Encryption Without Random Oracles", in Advances in Cryptology—CRYPTO 2004, ed. by M. Franklin, Santa Barbara, CA, Aug. 15-19, 2004. Lecture Notes in Computer Science, vol. 3152 (Springer, Berlin, 2004), pp. 1-24.
Boneh, Dan, et al., "Hierachicai Identity Based Encryption with Constant Size Ciphertext", Hierachical identity based encryption with constant size ciphertext, in Advances in Cryptology—EUROCRYPT 2005, ed. By R. Cramer, Aarhus, Denmark, May 22-26, 2005; Lecture Notes in Computer Science, vol. 3494 (Springer, Berlin, 2005), pp. 1-29.
Boneh, Dan et al., "Public Key Encryption with Keyword Search", in Advances in Cryptology—EUROCRYPT 2004, ed. by C. Cachin, J. Camenisch, Interlaken, Switzerland, May 2-6, 2004. Lecture Notes in Computer Science, vol. 3027 (Springer, Berlin 2004), pp. 1-15.
Boneh Dan, et al., "Identity Based Encryption from the Weil Pairing", SIAM J. Comput. 32(3), (2003), pp. 1-31.
Boneh, Dan et al., "Space-Efficient Identity Based Encryption Without Pairings", In Proceedings of FOCS 2007, pp. 1-37.
Boneh, Dan, et al., "Conjunctive, Subset, and Range Queries on Encrypted Data", in TCC 2007. 4th Theory of Cryptography Conference, ed. by S.P. Vadhan, Amsterdam, The Netherlands, Feb. 21-24, 2007. Lecture Notes in Computer Science, vol. 4392 (Springer, Berlin, 2007). pp. 1-29.
Boneh, Dan et al, "Chosen-Ciphertext Security from Identity-Based Encryption", SIAM of Computing (SICOMP), vol. 36, Issue 5, 2006, pp. 1-30.
Bradshaw, Robert W. et al., "Concealing Complex Policies with Hidden Credentials", In: Proceedings of the 11th ACM Conference on Computer and Communications Security . (2004), pp. 1-12.
Chase, Melissa, et al., "Improving Privacy and Security in Multi-Authority Attribute-Based Encryption", CCS '09, Nov. 9-13, 2009, Chicago, Illinois, USA, pp. 1-10.
Chase, Melissa "Multi-Authority Attribute Based Encryption", In TCC, vol. 4302 of LNCS, 2007, pp. 1-20.
Cheling, Ling, et al., "Provably Secure Cipher text Policy ABE" CCS'07, Oct. 29-Nov. 2, 2007, Alexandria, Virginia, USA, 2007, pp. 456-465.
Gentry, Craig, et al., "Hierarchical ID-Based Cryptography", In Yuliang Zheng, editor, Advances in Cryptology—ASIACRYPT 2002, vol. 2501 of Lecture Notes in Computer Science, Queenstown, New Zealand, Dec. 1-5, 2002. Springer-Verlag, Berlin, Germany, pp. 1-21.
Goyal, Vipul, et al., "Bounded Ciphertext Policy Attribute Based Encryption", 35th International Colloquium, ICALP 2008, pp. 579-591.
Goyal, Vipul, et al., "Attribute-Based Encryption for Fine-Grained Access Control of Encrypted Data", In Proceedings of the 13th ACM conference on Computer and Communications Security, 2006, pp. 1-28.
Katz, Jonathan, et al., "Predicate Encryption Supporting Disjunctions, Polynomial Equations, and Inner Products", Eurocrypt, 2008, pp. 1-29.
Lewko, Allison, et al., "Fully Secure Functional Encryption: Attribute-Based Encryption and (Hierarchical) Inner Product Encryption", Eurocrpyt, 2010, pp. 1-58.
Lin, Huang, et al., "Secure Threshold Multi Authority Attribute based Encryption Without a Central Authority", In INDOCRYPT, vol. 5365 of LNCS, Springer, 2008, pp. 426-436.
Lindsay, Jennifer Milicent, "Multi-Authority Attribute Based Encryption Revisited: A Fully Autonomous Scheme", A thesis submitted to John Hopkins University in conformity with the requirements for the degree of master of Science, Baltimore, Maryland, Apr. 2008, pp. 1-34.
Miklau, Gerome, et al, "Controlling Access to Published Data Using Cryptography", Proceedings of the 29th VLDB Conference, Berlin, Germany, 2003, pp. 1-12.
Muller, Sascha, et al., "Distributed Attribute-Based Encryption", 11th International Conference on Information Security and Cryptology, 2008, pp. 30-36.
Mueller, Sascha, et al., "On Multi-Authority Ciphertext-Policy Attribute-Based Encryption", Bull. Korean Math. Soc. 46, No. 4, 2009, pp. 803-819.
Ostrovsky, Rafail, et al., Attribute-Based Encryption with Non-Monotonic Access Structures:, ACMCCS 2007, pp. 1-17.
Pirretti, Matthew, et al., "Secure Attribute-Based Systems", CCS '06 Oct. 30-Nov. 3, 2006, Alexandria, Virginia, USA, pp. 1-14.
Sahai, Amit, et al., Fuzzy Identity-Based Encryption, Eurocrypt 2005, pp. 1-15.
Shamir, Adi, "Identity-Based Cryptosystems and Signature Schemes", in Advances in Cryptology—CRYPTO'84, ed. by G.R. Blakley, D. Charm, Santa Barbara, CA, Aug. 19-23, 1985. Lecture Notes in Computer Science, vol. 196, Springer, Berlin, 1965, pp. 47-53.
Shi, Elaine, et al., "Multi-Dimensional Range Query over Encrypted Data", May 2006, School of Computer Science, Carnegie Mellon University, Pittsburgh, PA, pp. 1-49.
Shi, Elaine, et al., "Delegating Capabilities in Predicate Encryption Systems", ICALP 2008, pp. 1-35.
Smart, Nigel P., "Access Control Using Pairing Based Cryptography", M. Joye (Ed.), 2003, LNCS 2612, Springer-Verlag Berlin Heidelbe, pp. 111-121.
Waters, Brent, "Efficient Identity-Based Encryption Without Random Oracles", Eurocrypt 2005, pp. 1-13.
Waters, Brent, "Ciphertext-Policy Attribute-Based Encryption:An Expressive, Efficient, and Provably Secure Realization", PKC, 2011, pp. 1-30.
Manual, Barbosa and Pooya Farshim "Secure Cryptographic Workflow in the Standard Model." Proceedings of Progress in Cryptology—INDOCRYPT 2006, 7th International Conference on Cryptology in India, Kolkata, India, Springer, vol. 4329 of Lecture Notes in Computer Science, pp. 379-393, Dec. 2006.

\* cited by examiner

Figure 4

304 Database

| GID 420 | Attribute Name 440 | Attribute Value 460 |
|---|---|---|
| GID 1 | Years of Experience | 3 |
| GID 1 | Employee | Y |
| GID 1 | Executive | Y |
| GID 2 | Years of Experience | 10 |
| GID 2 | Employee | Y |
| GID 2 | Executive | N |

472 — (first three rows, GID 1)
474 — (last three rows, GID 2)

410

SYSTEM, APPARATUS AND METHOD FOR DECENTRALIZING ATTRIBUTE-BASED ENCRYPTION INFORMATION

The present application claims the benefit of U.S. Provisional Patent Application Ser. No. 61/495,735, filed Jun. 10, 2011, which is incorporated herein by reference.

TECHNICAL FIELD

This invention relates generally to data encryption, and more particularly to attribute-based encryption.

BACKGROUND

Data encryption is a fundamental tool for ensuring the confidentiality of sensitive data. In an encryption system, readable 'cleartext' data is mathematically transformed (or 'encrypted') into 'ciphertext' using a cryptographic key. A recipient with an appropriate cryptographic key can reverse the encryption process ('decrypt') to recover the original cleartext data. If the system is designed properly, the encrypted ciphertext should reveal no information about the original cleartext.

Historically, many encryption systems used the same key for both encryption and decryption of data. A limitation of this approach stems from the fact that the key must then be securely distributed to all parties before any encrypted messages can be exchanged. Indeed, the 'key distribution problem' has long been recognized as a major challenge facing cryptographic security systems.

The development of public key encryption schemes such as the system developed by Ronald Rivest, Adi Shamir, and Leonard Adleman ("RSA system") represents a major step towards solving the key distribution problem. In this approach keys are created in pairs, with each pair including a "public key" and a "secret key". The public key can be used to encrypt messages, but cannot be used to decrypt. Thus a user can widely distribute the public key, and retain the secret key for decryption.

Unfortunately, the public key encryption model has several limitations. First, prior to encrypting the message the sender must know the identities of each individual to whom the message will be delivered. Secondly, he must know the individuals' public keys. This is challenging in many common usage scenarios. For example, an employee might wish to securely share data with all members of the 'Accounting' group, but might not have a full listing of the group members and their keys. Furthermore, once encrypted, the document would not be accessible to any new members who should later join the group.

Among the approaches for resolving this issue, one solution, 'Attribute Based Encryption', replaces the public (encryption) key with two values: a parameter generated by a trusted party known as an Authority, and a 'policy' describing the attributes of the users to whom the message was addressed. The Authority also generates decryption keys that each embed one or more attributes describing a user. A key can be used to decrypt the ciphertext if and only if it contains attributes that satisfy the policy used to encrypt. It should be noted that in an 'Attribute Based Encryption' scheme only certain limited types of policies may be employed.

In the Attribute Based Encryption approach, all keys and parameters are created by a single Authority. In practice, there are situations where it is desirable to use two or more Authorities, each responsible for a different set of Attributes. Unfortunately the basic Attribute Based Encryption approach does not support encryption policies that reference multiple authorities.

SUMMARY

In accordance with an embodiment, a method of encrypting a ciphertext is provided. A first authority parameter is received from a first authority. A second authority parameter is received from a second authority. A policy is generated based on the first authority parameter and the second authority parameter. The generated policy comprises a flexible access control structure. A ciphertext is constructed based on the policy.

In accordance with another embodiment, a method of decrypting a ciphertext is provided. A ciphertext comprising a policy is received. A request is transmitted to a first authority, the request comprising a first attribute identifier and a first decryptor identifier. A first key is received from the first authority in response to the request to the first authority. A request is transmitted to a second authority, the request comprising a second attribute identifier and a second decryptor identifier. A second key is received from the second authority in response to the request to the second authority. A decryption key is generated based on the policy, the first key and the second key. The ciphertext is decrypted with the decryption key.

In accordance with another embodiment, a method of decrypting a ciphertext is provided. A ciphertext comprising a policy is received. A request is transmitted to a first authority, the request comprising an identifier. A first certificate is received from the first authority in response to the request to the first authority. A request is transmitted to a second authority, the request comprising an identifier. A second certificate is received from the second authority in response to the request to the second authority. The first certificate and the second certificate are transmitted to a third authority. A decryption key is received in response to the first certificate and the second certificate. The ciphertext is decrypted using the decryption key.

In accordance with another embodiment, a method of encryption is provided. A first authority parameter is received from a first authority. A second authority parameter is received form a second authority. A message is generated. A policy is generated. A first ciphertext component is constructed based on the policy, the message, and the first authority parameter, wherein the first ciphertext component comprises a first confounding factor. A second ciphertext component is constructed based on the policy, the message, and the second authority parameter, wherein the second ciphertext component comprises a second confounding factor.

These and other advantages of the present disclosure will be apparent to those of ordinary skill in the art by reference to the following Detailed Description and the accompanying drawings.

BRIEF DESCRIPTION OF THE DRAWINGS

FIG. 4 shows an example of a database in accordance with an embodiment;

DETAILED DESCRIPTION

In accordance with an embodiment, a system for constructing a ciphertext based on a policy is provided. A first authority parameter is received from a first authority and a second authority parameter is received from a second authority. A message may be generated. A policy is generated based on the first authority parameter and the second authority parameter. The policy may comprise a flexible access control structure. Based on the policy, the message may be encrypted forming a ciphertext.

In certain embodiments the first authority and the second authority do not communicate. In certain embodiments, the first authority parameter and the second authority parameter may be received from distinct organizations. In certain embodiments, the first authority and the second authority and one or more of the authority parameters associated with the authorities may vary over time.

In certain embodiments, the flexible access control structure comprises a set of parameters and a set of operators. The set of parameters may be received from an authority or collection of authorities. Such parameters are authority parameters. Authority parameters may be used to make up a policy. An example of/an authority parameter is a grade point average ("GPA") of a student. A particular authority may announce to encryptor 210 that it can provide keys for use in decrypting messages that have been encrypted with a policy that includes a condition relating to the value of a student's GPA.

In certain embodiments, the flexible access control structure may express a set of conditions that must be met for the policy to be satisfied. A flexible access control policy may comprise threshold operators such as a greater than operator, a less than operator, an equal operator, or other similar threshold operators, such as but not limited to possessing k out of n attributes. For example, a particular flexible access control structure may specify that a first parameter must be greater than a number, e.g. age >21. In certain embodiments, a particular flexible access control structure may specify conditions for a plurality of parameters.

In certain embodiments elements of a flexible access control policy may be received from an authority. For example, in certain embodiments, authority parameters may be received from an authority or collection of authorities. The authority parameters may be received over a network, via a storage device such as a flash storage device, via a local network such as a near field communication network or via other means for sending and receiving messages. In certain embodiments, a component of an authority parameter may be signed by a certificate authority or another entity that provides a digital certificate. In certain embodiments, a component of an authority parameter may be generated inside a hardware security module.

Figure 1:
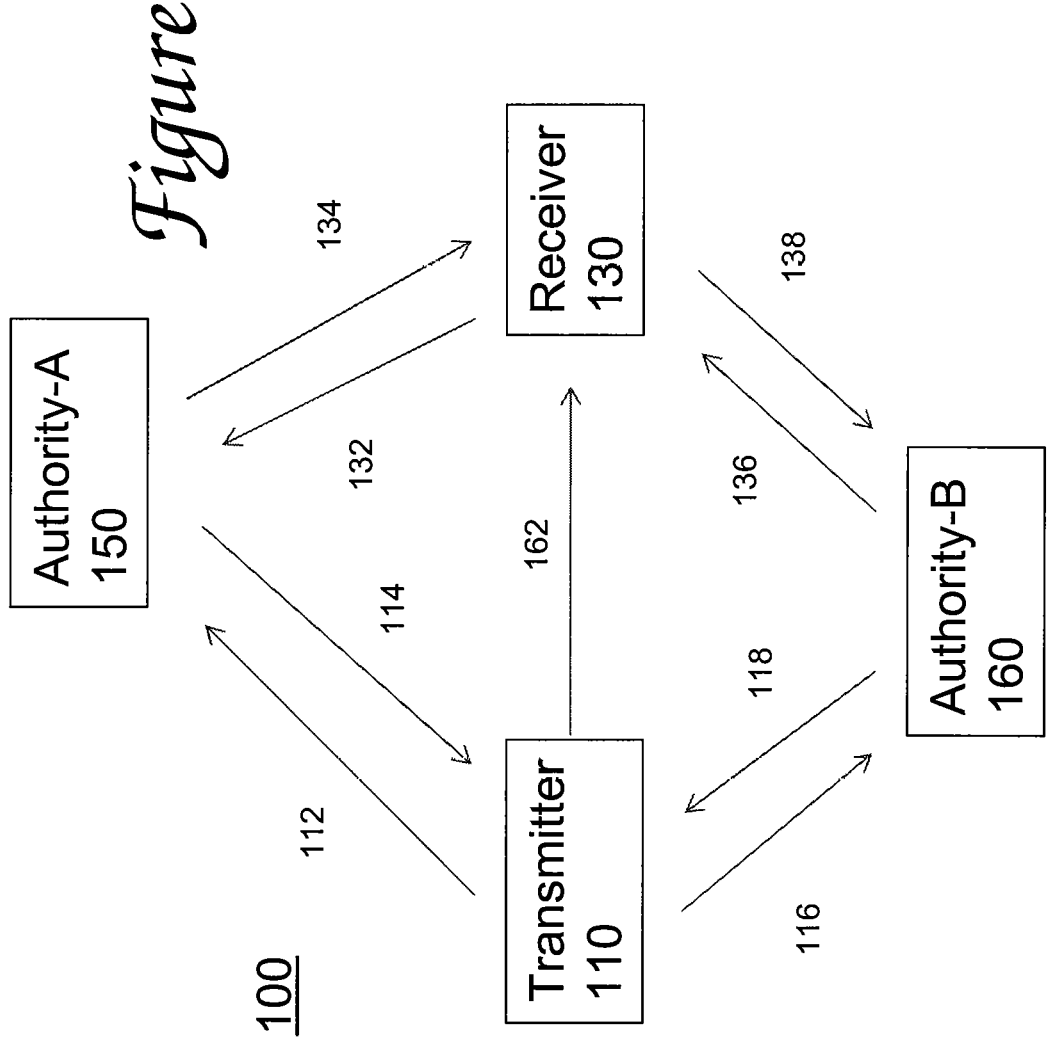
FIG. 1 shows messages sent between a transmitter, a receiver and two authorities in accordance with an embodiment.

In an exemplary embodiment, as illustrated in FIG. 1, transmitter 110 may wish to send a message that is initially unencrypted ("plaintext") in an encrypted form ("ciphertext") to one or more recipients that belong to a particular group or groups or that have a particular set of characteristics. For example, transmitter 110 may wish to transmit a message that is encoded so that the message will be readable only by receiver 130 if receiver 130 belongs to a particular group. That is, transmitter 110 may define a policy and encode the message so it can only be decoded by receiver 130 if receiver 130 satisfies the requirements of the policy. The parameters that make up the policy define the characteristics of receivers who will be able to decrypt the message. In an illustrative example of such a message transmission scenario we can consider a message intended for a certain group of students at a university.

For example, suppose that a company wishes to make an announcement of an internship opportunity to students at a local university, however the company only wants the announcement to be readable by students at the local university who have a Grade Point Average ("GPA") greater than 3.5 at the university and who are also members of a particular organization, such as the Association of Computing Machinery ("ACM"). In order to identify the students who meet the requirements of the policy, the encryptor must identify a source of information ("an authority") that can confirm whether a receiver of the message falls into each of the categories required by the policy. For example, a Department of Motor Vehicle Office of a particular state can offer a decryption key to a particular person that falls into a category of licensed drivers in that state.

One way to generate an announcement as required for the illustrative embodiment would be to request a list of all students who have a GPA over 3.5 from the university and to request a list of all ACM members at the university from the ACM. Once each of these lists were compared and members of each group were matched an email list that satisfies the policy could be created. Using an encryption system such as RSA, steps could be taken to generate and transmit an encrypted message to each of the recipients identified in that email list.

In accordance with an embodiment, an alternative method for communicating such an announcement may be employed. In the illustrative embodiment, the company could encrypt the announcement using a policy that identifies the intended recipients. Such an encrypted announcement could be broadcast to the university as a whole, but would only be readable by recipients who satisfy the policy that was used to encrypt the message.

Referring to FIG. 1, the company, or an individual at the company, would be transmitter 110. As a first step transmitter 110 generates a policy that defines the intended recipients of the message. Such a policy comprises an access control structure, that is, a set of parameters and logical operators that specify the characteristics of an intended receiver. Such access control structure may be described as a flexible access control structure if the policy is flexible enough to define any group that can be expressed as an arrangement of Boolean operators. In the illustrative embodiment, transmitter 110 may define a policy that includes an access control structure such as:

Member ACM=Yes and GPA>3.5.

In accordance with an embodiment, transmitter 110 will identify authorities who have the information necessary to identify receivers who fall within the category or categories defined by the policy. For example, transmitter 110 may identify a first authority that can confirm whether an individual belongs to the ACM, such as the ACM central membership office, and a second authority that can confirm whether a particular individual is a student at a university with a GPA greater than 3.5, such as the university's registrar's office. In addition to the information required to assess the policy, each of the authorities must also have the global identifier ("GID") that can be used by the authority to identify the recipient of the message. Such a GID may be, for example, a Social Security Number ("SSN") or similar uniquely identifying number or string. In the illustrative embodiment a GID might be a Student ID number. In some other embodiments, a GID may be a phone number or email address. It should be noted that in certain embodiments an authority may be able to receive an identifier (such as a username-password combination) and translate that identifier to a particular GID that can be used in generating an authority parameter and/or a decryption key. For example, the university might be able to translate a Student ID number into an SSN, which will then be used as the GID for encryption purposes.

Referring again to FIG. 1, transmitter 110 may send a request to authority-A 150, such as request 112 to receive an authority parameter from authority-A 150. In response transmitter 110 may receive the authority parameter from authority-A 150 in response 114. Similarly, transmitter 110 may send request 116 to authority-B 160 and receive back response 118 from authority-B 160.

Once transmitter 110 has received an authority parameter from each of the authorities who are associated with the policy, transmitter 110 may generate the policy and encrypt the message using the policy in accordance with an embodiment. The details of the encryption process are described in further detail below.

Having encrypted the message to generate a ciphertext, the transmitter 110 broadcasts 162 the encrypted message so that it is available to one or more potential decryptors. In the illustrative embodiment shown in FIG. 1, the message is received by a particular recipient, receiver 130, who may perform steps to decrypt the message. Note that broadcasting in this context may comprise various delivery mechanisms such as broadcasting of messages, networked delivery such as email, delivery via physical storage device, or other similar means for communicating messages.

Receiver 130 may analyze the encrypted message to identify each of the authorities and the requirements of the policy associated with the message. Based on the analysis of the message, receiver 130 may determine that receiver 130 already has each of the key components necessary to decrypt the encrypted message, where each key component is associated with one or more of the authority parameters that make up the policy used to encrypt the encrypted message. Alternatively, receiver 130 may generate requests 132, 138 to be sent to the respective authorities 150, 160 who are associated with the encrypted message. In the illustrative embodiment, either before or after receiving the encrypted message, receiver 130 may generate a message to be sent to the ACM membership office. The message to the ACM membership office will contain a GID such as a student ID or a SSN or another identifier that the ACM membership office can accept as an identifier of receiver 130 and the component of the policy that refers to the ACM ("Membership in ACM=Yes"). Receiver 130 may also generate a message to be transmitted to the university registrar. The message to the university registrar may contain the same GID that receiver 130 transmitted to any other authorities who are associated with the encrypted message or be a value that the authorities can readily translate into the GID associated with this user. For example, if receiver 130 transmitted his SSN to an authority such as the ACM membership office to obtain a first key component needed to decrypt the message he will also send the same SSN to any other authorities or he might send his Student ID number to the university with the understanding that the university can uniquely map this number to his SSN, which it will then use to generate the second key component. For example, receiver 130 may transmit his Student ID number to the university registrar with a request for a key component associated with his SSN as the GID and the component of the policy associated with the university registrar ("GPA>3.5").

In response to the requests 132, 138 from receiver 130 to the authorities, each of the authorities 150, 160 transmit messages 134, 138 containing decryption keys for the encrypted message to receiver 130. Note that these requests may have been made before or after the receipt of the encrypted message. In the illustrative embodiment, the ACM authority transmits a decryption key for a component of the encrypted message associated with the ACM and the university registrar transmits a decryption key for the component of the encrypted message associated with the GPA. Once the receiver 130 has each decryption key necessary for decoding the encrypted message, receiver 130 can decrypt the encrypted message to generate a plaintext version of the announcement.

In certain embodiments, an access control structure may include various operators that define the relationships between each of the conditions that make up the access control structure. In certain embodiments an access control structure may include a Boolean formula over authority parameters or other parameters that may be part of a policy. Exemplary operators may include an AND operator, an OR operator, a NOT operator, a NOT EQUAL operator, an EQUAL operator, and other operators or combinations of operators that may be appropriate for use in defining a policy. For example, for a policy may include a set of conditions related by various operators.

An example of an access control structure in accordance with an embodiment may take a form such as:
((PARAMETER1>1.0) AND
(PARAMETER2=LICENSED)) OR
(NOT ((PARAMETER3<45) AND
(PARAMETER4>7))

In certain embodiments, the flexible access control structure comprises a set of parameters, such as the authority parameters or other parameters, and a set of operators.

Figure 2:
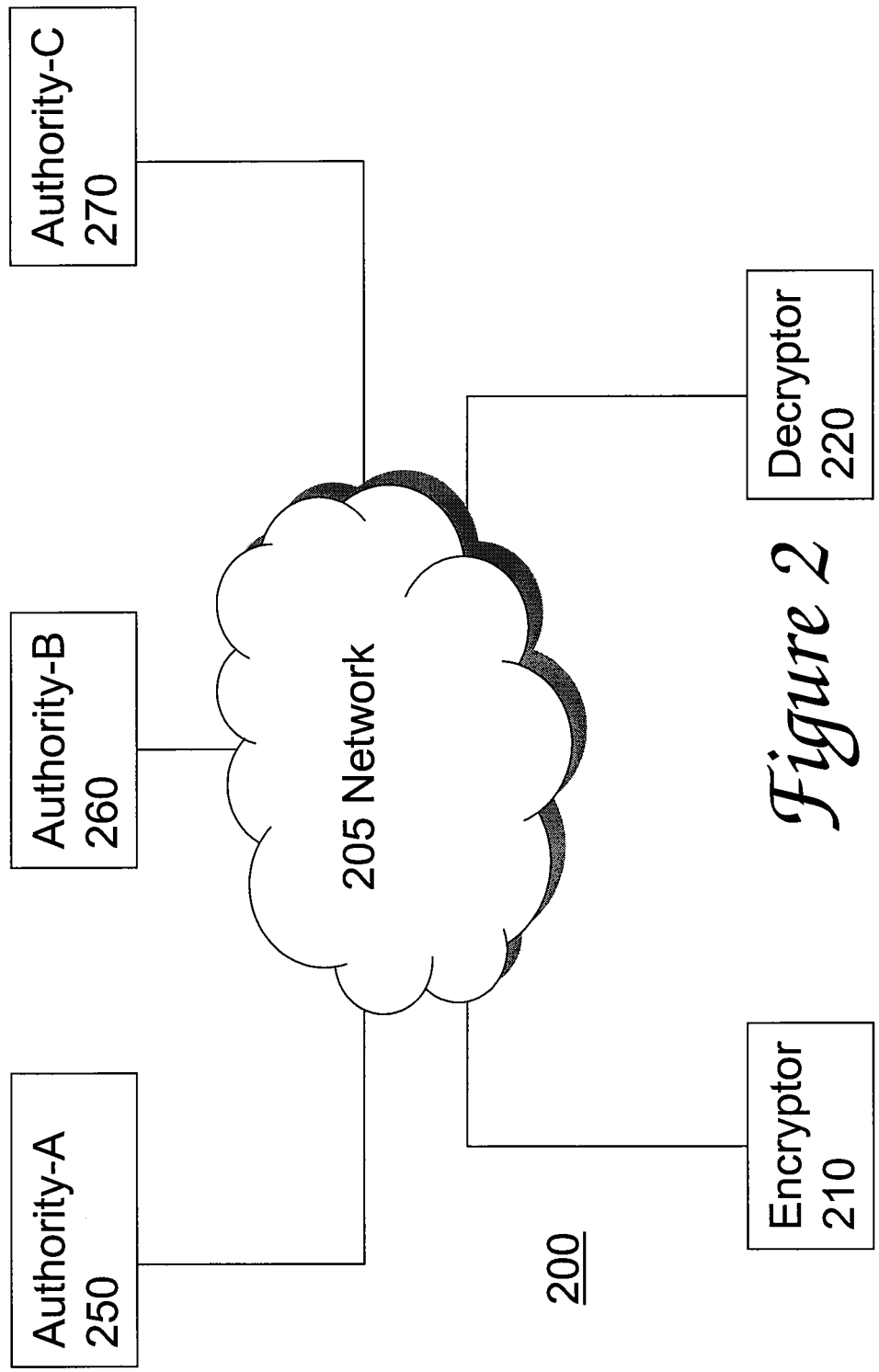
FIG. 2 shows an encryptor and a decryptor in communication via a network with multiple authorities in accordance with an embodiment.

FIG. 2 shows a communication system 200 that may be used to provide secure message communication in accordance with an embodiment. Communications system 200 comprises a network 205, an encryptor 210, a decryptor 220, and three authorities, a first authority such as authority-A 250, a second authority such as authority-B 260, and a third authority such as authority-C 270. For convenience, the term "authority" is used herein to refer to any one of authority-A 250, authority-B 260, etc. Accordingly, any discussion herein referring to "authority" is equally applicable to each of authority-A 250, authority-B 260, authority-C 270, etc.

In the foregoing, examples of relationships between authority-A 250 and authority-B 260 are described. Each of these relationships could also occur between authority-A 250 and authority-C 270 or between authority-B 260 and authority-C 270, or between those authorities and other additional authorities that may be included in a particular embodiment of this disclosure. In certain embodiments, authority-A 250 may be connected to network 205 and authority-B 260 may be connected to network 205, yet authority-A 250 and authority-B 260 may not be in communication or may never have exchanged messages. In certain embodiments, authority-A 250 and authority-B 260 may have exchanged information but have not exchanged information related to encryptor 210 or decryptor 220. In certain embodiments, authority 250-A may not be aware of the existence of authority 250-B and vice versa.

In an exemplary embodiment illustrated in FIG. 2, network 205 is the Internet. In other embodiments, network 205 may comprise one or more of a number of different types of networks, such as, for example, an intranet, a local network (LAN), a wide network (WAN), a wireless network, a fiber channel-based storage network (SAN), or Ethernet. Other networks may be used. Alternatively, network 205 may comprise a combination of different types of networks such as a local area network (LAN), personal area network, an ad hoc network based on a protocol such as Bluetooth or a local connection such as a near-field communication connection, or other appropriate networks.

In certain embodiments, encryptor 210 and decryptor 220 may each be individuals who use computers to encrypt and decrypt messages. In certain embodiments, one or both of encryptor 210 or decryptor 220 may not be a person or individual, but another type of entity such as a computer, a mobile device, or a computing device capable of generating and transmitting a message or receiving and decrypting a message. In certain embodiments, such an entity may be an organizational unit, a computer, or another device which has associated attributes and is capable of transmitting or receiving secure messages.

Generally in accordance with an embodiment, decryptor 220 has an associated GID. A global identifier may be, for example, a social security number, a student ID number, a phone number, an email address, an IP address, a MAC address or another identifier that can be used to specify a particular individual or entity. Various sources may be used to generate GIDs. For example, in certain embodiments GIDs may be derived from social security numbers, in certain embodiments GIDs may be derived from an employee identification number or a student ID number or another source of an identifier associated with a particular entity or group of entities. In certain embodiments GIDs may be generated via biometric techniques such as fingerprinting, iris scanning, or other means of associating an identifier with an entity.

In an exemplary embodiment of FIG. 2, each or any of authority-A 250, authority-B 260 and authority-C 270 may be networked servers. In certain embodiments an authority may be a computer and may comprise one or more databases. In an exemplary embodiment authority 250 may have access to a global identifier (GID) that may be associated with an entity. It should be noted that in certain embodiments more than one authority may operate from an individual server.

Figure 3:
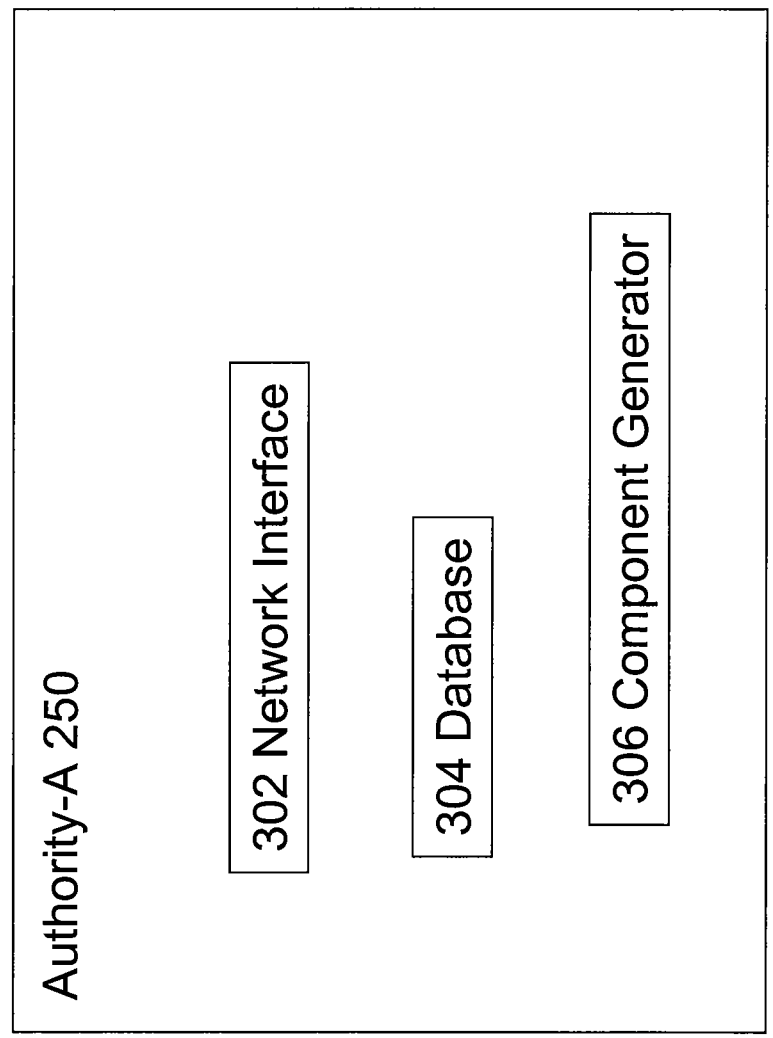
FIG. 3 shows functional components of an exemplary authority in accordance with an embodiment.

FIG. 3 shows functional components of authority-A 250 in accordance with an embodiment. In an embodiment, authority 250 may comprise a network interface 302, a database 304, and a key component generator 306. Authority 250 may receive and transmit information via network interface 302 through network 205. In an embodiment network interface 302 may comprise a web server that allows an entity to communicate with authority 250 via a web page or other interface that may be accessed from a computer, a handheld device, a phone or other similar devices. In accordance with an embodiment, components of authority-B 260 and authority-C 270 have similar functionality as components of authority-A 250.

FIG. 4 illustrates database 304 in accordance with an embodiment. A database such as database 304 may be maintained by an authority to associate certain attributes with particular entities. For example, in a case where the authority is an organization such as the ACM, such a database may include a list of names, each name associated with an ACM membership number and a value for current membership status. Alternatively, in an embodiment where an authority is a university registrar such a database may include a list of names, GPAs for each name, a list of classes that each individual is taking or has taken or other information relevant to a student's role at a university.

For example, in an exemplary database such as database 304, there are a set of attributes and values for those attributes that are associated with two GIDs: GID 1 and GID 2.

In an exemplary embodiment, data stored within database 304 may be represented as a table such as table 410. Table 410 may contain one or more types of information represented as columns. In an exemplary embodiment such as table 410, the columns include: a GID 420, an attribute name 440, and an attribute value 460. Database 304 may include one or more records such as record 472 and record 474. Records, such as record 472 and record 474, may associate an attribute name and an attribute value with a particular GID, such as GID 1. For example, as illustrated in FIG. 4, GID 1 is associated with an attribute named "Years of Experience" with an attribute value of 3. In certain embodiments one or more attributes associated with a GID may vary over time. For example, in an exemplary embodiment, an attribute such as "Years of Experience" varies at the turn of an employee's anniversary of hire date. Other attributes such as an attribute that indicates whether one is an executive may have a value of "Yes" at a particular time and a value of "No" at a later time or vice versa. One skilled in the art will appreciate that in certain embodiments, database 304 may be organized into multiple tables, databases and relationships. In certain embodiments, attributes may be identified by attribute identifiers that an authority may use to reference an attribute. An attribute identifier may be a text string, a number, or another object. In certain embodiments, an attribute identifier may be one or more of the following types of information: a name, an organizational role, a date, a time, an event or entity characteristics, such as "male", "Ohio resident", "Harvard alum", "PC running Windows", "server with its security updates current", etc.

In an embodiment an entity may wish to transmit a message so that it can only be decrypted by recipients who have attributes that satisfy a particular policy. In order to transmit such a message an entity may generate a policy based upon authority parameters received from one or more authorities. In an exemplary embodiment, an encryptor may wish to encrypt a message that may be read by anyone who satisfies a particular policy. An example of such a policy is a policy such as:

Policy=((Years of Experience>5) AND
(Employee=$Y$)) OR ((Executive=$Y$) AND (NOT
(Years of Experience<1))).

Figure 5:
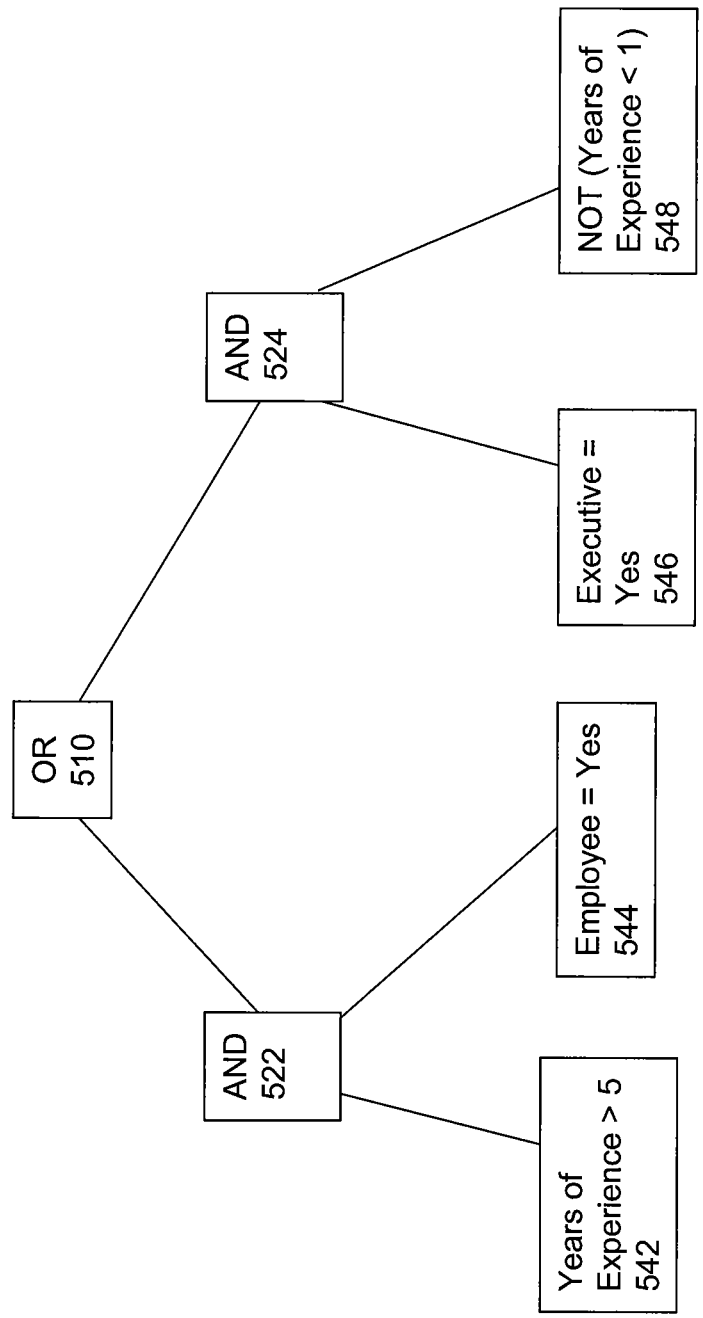
FIG. 5 shows a schematic illustration of an exemplary relationship between attributes and Boolean operators in accordance with an embodiment.

FIG. 5 illustrates relationships among the Boolean operators that make up a policy such as the above policy. The above Policy, when used during encryption of a message in accordance with an embodiment, will ensure that the encrypted message may be deciphered only by an employee who has more than 5 years of experience, or by an executive who does not have less than 1 year of experience. Extremely complex and descriptive formulae may be constructed by adding additional attributes and logical relations. In the example shown in FIG. 5, there are four requirements 542, 544, 546, and 548 that make up the policy. Each of these requirements comprises an authority parameter, such as "Years of Experience" and "Employee" and a value against which the authority parameter is tested in order to determine whether a particular message receiver meets the requirement of a policy. Each of the requirements, 542, 544, 546, and 548, are related by the Boolean operators AND 522 and 524 and OR 510.

A system in accordance with an embodiment may support various types of policies. For example, certain embodiments may support the creation of any policy that may be represented as a monotone span program over the attributes. In addition, certain embodiments of the system may support negative literals (e.g., NOT gates). Monotone span programs are equivalent to a subclass of secret sharing schemes that are sometimes referred to as linear secret sharing schemes (LSSSs). In certain embodiments, concrete examples of LSSSs include, but are not limited to, Boolean formulas consisting of ANDs and ORs or a formula consisting of threshold gates (i.e., in an LSSS with a threshold gate a user must possess n out of k possible attributes.) Certain embodiments of the system may support policies that are made up of combinations of the representations described herein. Certain embodiments support the ability to use flexible access policies, e.g., consisting of arbitrary Boolean formulae, including AND, OR, and NOT gates. Certain embodiments support the ability to specify an encryption policy that references attributes from more than one authority, and does not place arbitrary restrictions on this structure.

In certain embodiments, a policy may comprise a flexible access control structure. Flexible access control structures may be described in terms of monotonic Boolean formulas. In certain embodiments, a flexible access control structure may be an LSSS access structure. In certain embodiments, flexible access control structures may be represented as Boolean formulas. For example a flexible access control structure may be represented as an access tree, where the interior nodes of the tree may be AND and OR gates or other appropriate gates, and the leaf nodes may correspond to attributes. In an embodiment where the flexible access control structure is represented as an access tree, the number of rows in a corresponding LSSS matrix will be same as the number of leaf nodes in the access tree.

In certain embodiments the flexible access control structure may be generated by the encryptor of the message. In certain embodiments, the encryptor may receive the flexible access control structure from a source of policies. For example, a flexible access control structure may be generated at an authority such as authority 150 or at another entity in communication with encryptor 210.

In accordance with an embodiment, an entity, such as encryptor 210, that wishes to encrypt a message may communicate with one or more authorities such as authority-A 250 and authority-B 260. The authorities who are associated with a particular encrypted message are specified by the policy associated with the encrypted message. Messages encrypted in accordance with an embodiment are accompanied by the associated policy or a reference to the associated policy. For example, if a policy requires membership in a particular organization, the secretary or membership office for that organization may be an authority associated with that policy. If a policy requires employment at a particular office, the human resources department at that office may be an authority associated with the policy.

Figure 6:
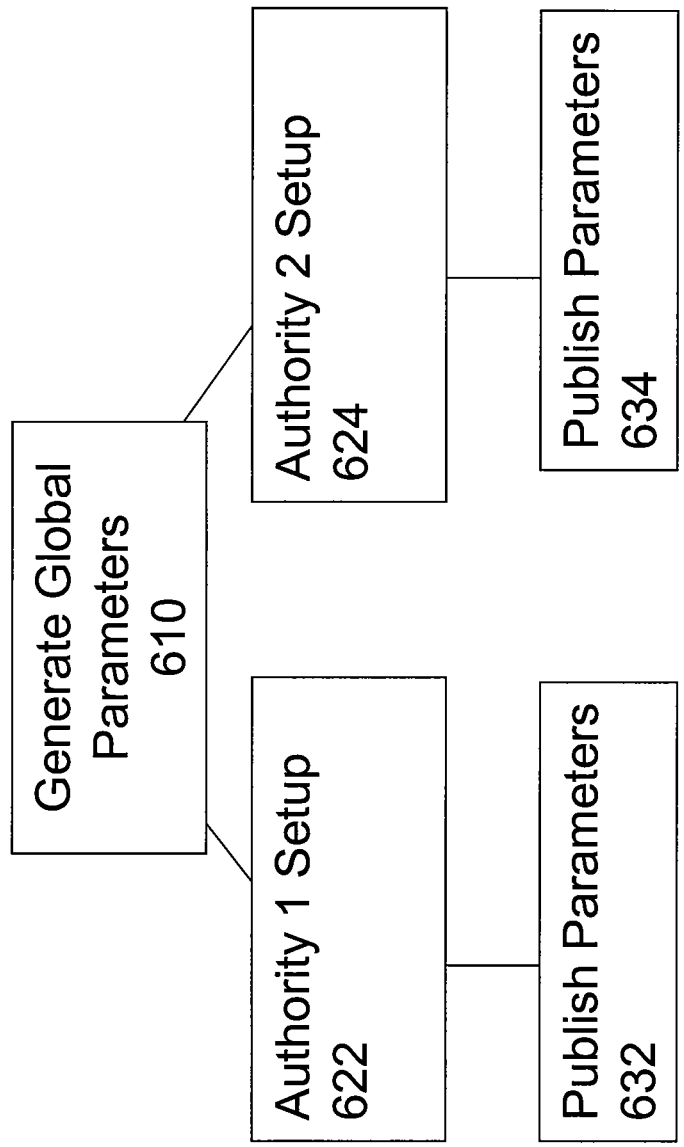
FIG. 6 shows a flow chart for a method of setting up two authorities in accordance with an embodiment.

FIG. 6 illustrates a series of steps that may be included in a method of publishing attributes from two authorities, authority 1 and authority 2, that may be used in a policy in accordance with an embodiment. In particular, FIG. 6 shows a first step 610 which occurs at some central organization, such as, for example the Social Security Administration for an SSN or a Domain Name Server for an IP address. Once the global parameters are generated and made available to each of authority 1 and authority 2, authority 1 and authority 2 may proceed in parallel through a set of steps.

In detail, at step 610 certain attributes are associated with a particular GID. For example, a GID associated with an employee with 10 years of experience may be assigned an attribute that indicates that the entity associated with that GID is an employee. Similarly, that same GID may be assigned an attribute that indicates that the entity associated with that GID has 10 years of experience. Such assignments may be used to populate a database. For example, such assignments may be used to update the elements such as 372 and 374 of a database such as database 304. In certain embodiments, step 610 may be performed by one or more authorities. In certain embodiments step 610 may be performed by an entity associated with a GID itself. In certain embodiments, attributes associated with a particular GID may be received by an authority from some other source of attributes.

At step 622 authority 1 receives a GID that may be associated with certain data that is stored by authority 1. For example, authority 1 may have one or more attributes in the form of names and values (name-value pairs) associated with one or more GIDs. The name associated with the attribute pair may be an authority parameter for that authority. Authority 2 may perform a similar action at step 624. One or more authorities may provide information regarding attributes as authority parameters to entities. The authority parameters may be used to generate a policy or policies for use in encrypting a message in accordance with an embodiment.

At step 632 authority-A 250 may publish information relating to the information stored in database 304. By publishing this information each authority may indicate to one or more entities the types of policies that it may support or the type of decryption key components that the authority may provide. Authority 2 may perform a similar action at step 634. Each of the authorities that may be involved in the generation of a policy may generate a set of authority parameters. The authority may then distribute the names of the authority parameters that it has to potential encryptors. Such distribution may be made via publication, such as by posting the authority parameters on a web site or through other similar means such as email or through print publication. Authority parameters are analogous to public keys that may be provided by an authority. An authority involved in generating a policy may also generate an authority secret key that is associated with each authority parameter.

To encrypt a message, an entity wishing to act as encryptor 210 first constructs an access policy for the message to be encrypted. In an embodiment, this policy may be structured as a Boolean formula consisting of AND, OR, and NOT gates over values, where each value identifies an authority and specifies an attribute that is associated with that authority. In a particular embodiment an attribute may be specified as a string such as, "Membership in ACM", or "Grade Point Average", or similar attribute that may be associated with a potential recipient of a message. Encryptor 210 knows one or more authority parameters for each authority referred to in a particular policy in order to construct a message that may be decrypted.

Decryptor 220 may receive a ciphertext through various means such as through the receipt of a broadcast message or other similar means for receiving messages. For example, decryptor 220 may receive an email containing the ciphertext. Alternatively a ciphertext may be posted on a web site or transferred via a physical transfer of a data storage device or made available through some other means. When decryptor 220 receives a ciphertext encrypted as described above, it may obtain a set of one or more decryption keys from the associated authorities in order to decrypt the ciphertext. The ciphertext comprises references to the authority or authorities that are associated with the policy with which the ciphertext was encoded.

Figure 7:
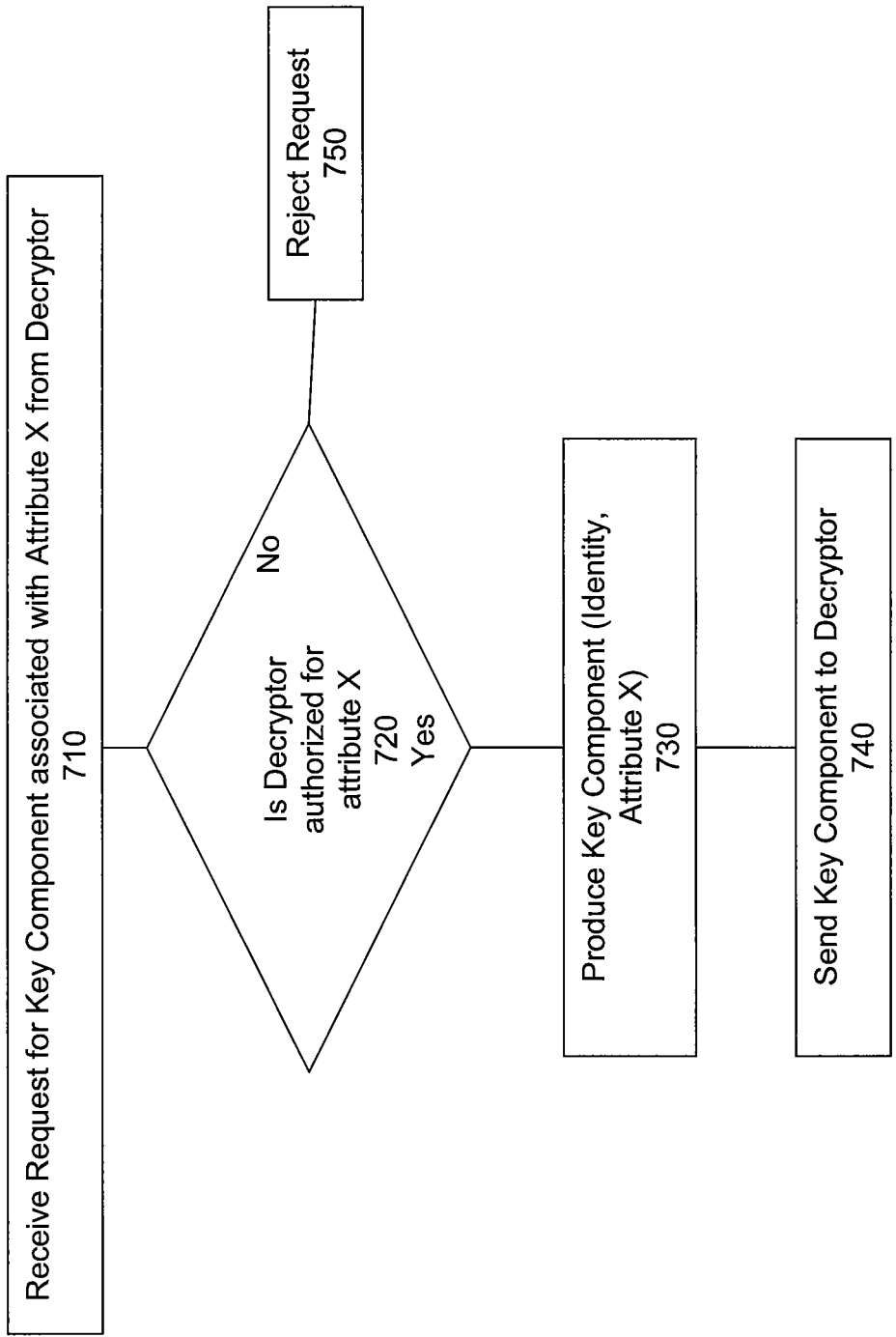
FIG. 7 shows a flow chart of a method of sending a key component to a decryptor in accordance with an embodiment.

Decryption key generation at an authority is illustrated in FIG. 7. Prior to step 710, decryptor 220 transmits a request to authority 150 for a key component associated with a particular attribute. The request may comprise a policy or a part of a policy associated with a particular attribute or attributes and a GID associated with decryptor 220. In certain embodiments, the request may comprise an attribute identifier. The GID associated with an encryptor may be referred to as a decryptor identifier. In certain embodiments, a different initial identifier may be used in communicating with each of one or more authorities. However, these initial identifiers may be converted so that each of the authorities uses the same GID for the decryptor during the key generation process. In certain embodiments, a decryptor identifier may comprise a variable length string of bits.

At step 710, authority 150 receives the request at network interface 202. Authority 150 then evaluates the request at step 720 to determine whether decryptor 220 is authorized to receive the requested decryption key component associated with a particular attribute, e.g. whether the decryptor is a member of a particular organization. In an exemplary embodiment, authority 150 checks database 304 for information that indicates whether the decryptor with the received GID is associated with a requested attribute. Based on the comparison of the GID and its associated attributes to the information in the database, authority 150 may reject the request as indicated in step 750 or authority 150 may cause key component generator 206 to produce a key component associated with the GID and the attribute as indicated in step 730. In certain embodiments, the authority may conduct a verification operation on the first decryptor identifier and the first attribute identifier in order to determine whether to return a decryption key in response to the request from decryptor 220. Examples of verification operations may include a request-response authentication operation, a transmission of a message to a third party to receive additional confirmation, or other means for verifying that the received decryptor identifier corresponds to decryptor 220.

If key component generator 206 of authority 150 produces the key component associated with the GID, the attribute authority 150 may proceed to step 740 in which the authority sends the key component to decryptor 220 associated with the GID. In certain embodiments, the GID or decryptor identifier may be included as part of a key component that decryptor 220 receives from authority 150. In certain embodiments, the decryption process will not yield the plaintext of the encrypted message unless each authority that provided a key component received the same decryptor identifier.

In an exemplary embodiment authority 150 and decryptor 220 may communicate via a communications network such as network 105. The GID might be a username or computer identity such as an IP address. Decryptor 220 may request from authority 150 one or more key components corresponding to specific attributes supported by that authority. Authority 150 may determine whether decryptor 220 is entitled to receive each key component associated with a particular attribute. If so, authority 150 generates the key component using the authority secret key and delivers the resulting key component to decryptor 220. In certain embodiments, decryptor 220 may maintain a collection of all key components corresponding to its GID. Such a collection may be referred to as a decryption key. In some embodiments decryptor 220 may maintain only one decryption key, while in others it may maintain several decryption keys. In certain embodiments, decryptor 220 may request one or more decryption keys prior to receiving the ciphertext. In certain embodiments, decryptor 220 may store one or more decryption keys on a smartcard or a tamper-resistant device.

In certain embodiments, decryptor 220 may transmit a request to authority 150 that does not include an attribute identifier. In certain embodiments, the request may comprise a GID and a general request for key components associated with the GID. In certain embodiments, decryptor 220 may transmit the empty string or a special symbol as an attribute identifier. For example, in an embodiment, in response to a request that includes just a GID, a GID with the empty string as the attribute identifier, or a GID with a special symbol as the attribute identifier, an authority may return any key components associated with the GID. In a particular example, an authority associated with a Department of Motor Vehicles may return a key component associated with a licensed driver in response to a request that includes only a driver license number. In another example, an authority associated with an employer may return every key component associated with the management committee in response to receiving a request that includes a GID of a management committee member and a general request to receive all keys associated with management committee members. In certain embodiments, an authority may initiate a key transfer to an entity. For example, an authority associated with an IT department may request a GID from an entity that is a client computer. In response to receiving the GID from the client computer, the IT server authority may return one or more components associated with the GID to the client computer.

Figure 8:
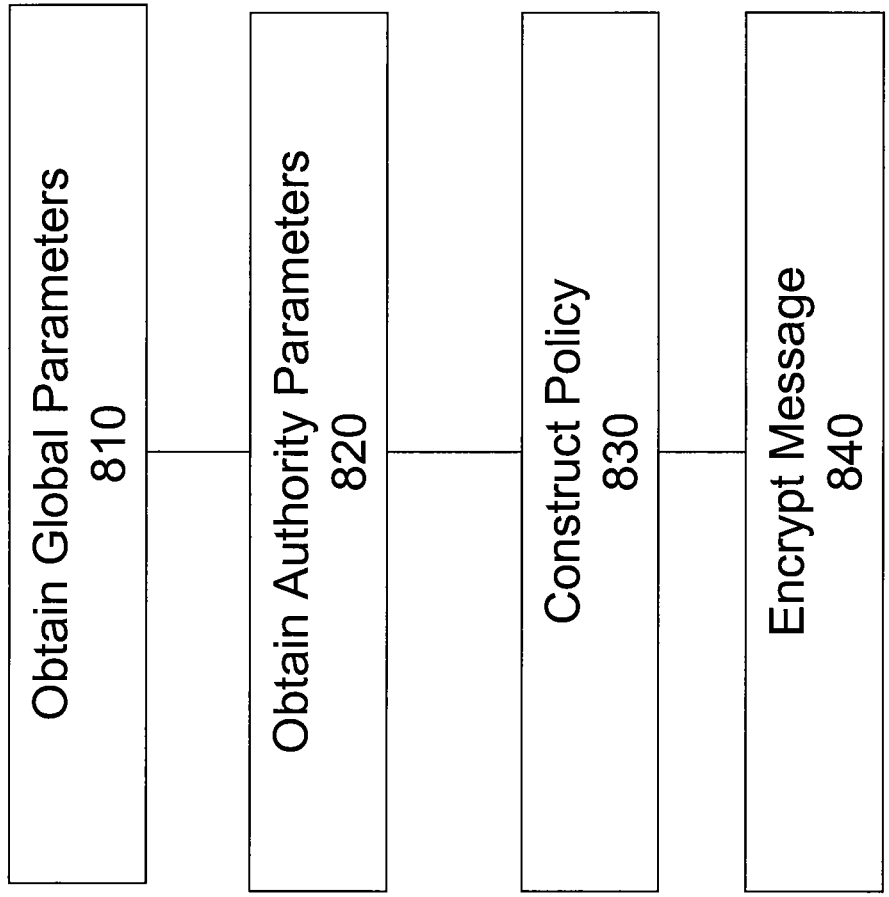
FIG. 8 shows a flow chart for encrypting a message in accordance with an embodiment.

Encryption of a message is illustrated in FIG. 8. At step 810, encryptor 210 obtains one or more global parameters. In certain embodiments global parameters may comprise names of attributes that may be associated with a group of entities or a particular entity. At step 820, encryptor 210 obtains one or more authority parameters from an authority such as authority 150. For example, in the illustrative embodiment encryptor 210 may receive a global parameter from some other authority. At step 830, encryptor 210 constructs a policy using the authority parameter or authority parameters that encryptor 210 has received from each authority associated with the policy. In an embodiment, the policy may comprise one or more global parameters as well as authority parameters. A global parameter may be a parameter that can be evaluated by more than one authority. At step 840, encryptor 210 encrypts a plaintext message to generate a ciphertext in accordance with an embodiment.

Figure 9:
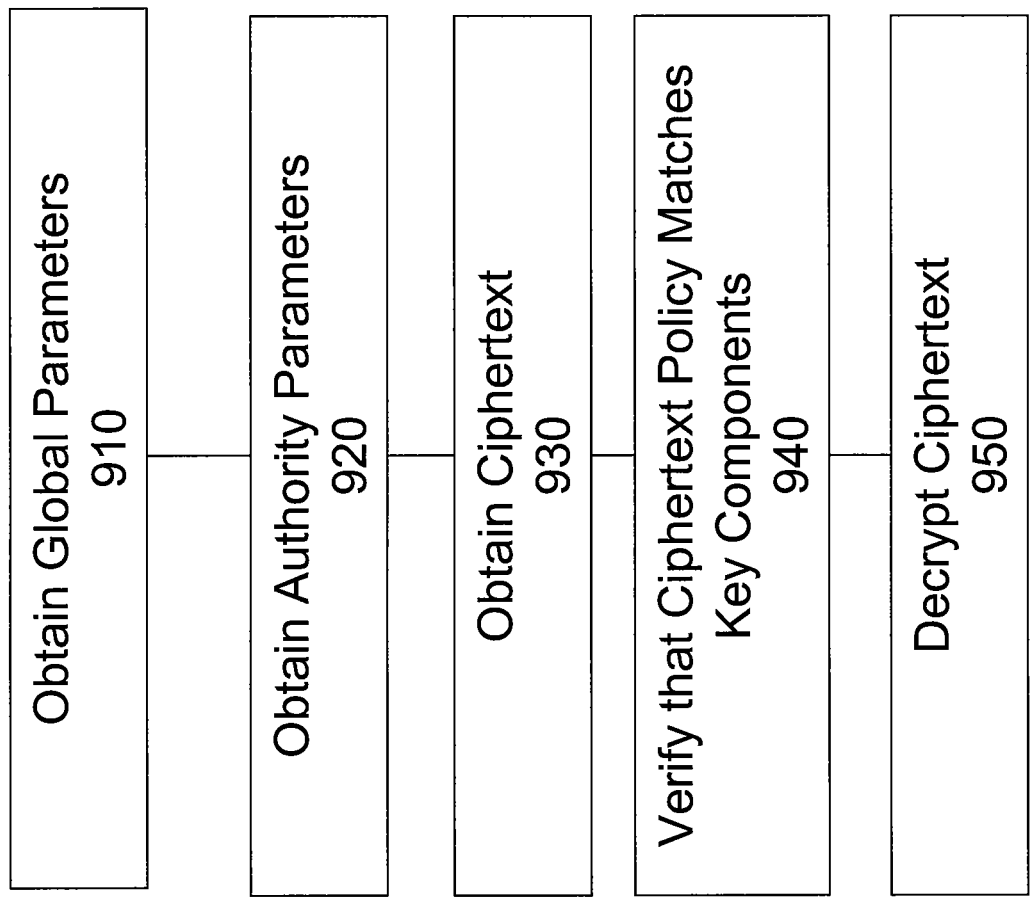
FIG. 9 shows a flow chart for decrypting a message in accordance with an embodiment.

Decryption of a message is illustrated in FIG. 9. At step 910, decryptor 220 obtains global parameters. At step 920, decryptor 220 obtains one or more key components from an authority such as authority 150. At step 930, decryptor 220 obtains a ciphertext to be decrypted. It should be understood by one skilled in the art, that step 930 may occur prior to steps 910 and 920 in certain embodiments. At step 940, decryptor 220 verifies that the ciphertext policy matches key components that decryptor 220 has received. In an embodiment where decryptor 220 does not have key components necessary to decrypt a particular ciphertext, decryptor 220 may request key components from one or more authorities. At step 950, decryptor 220 decrypts the ciphertext using key components.

Figure 10:
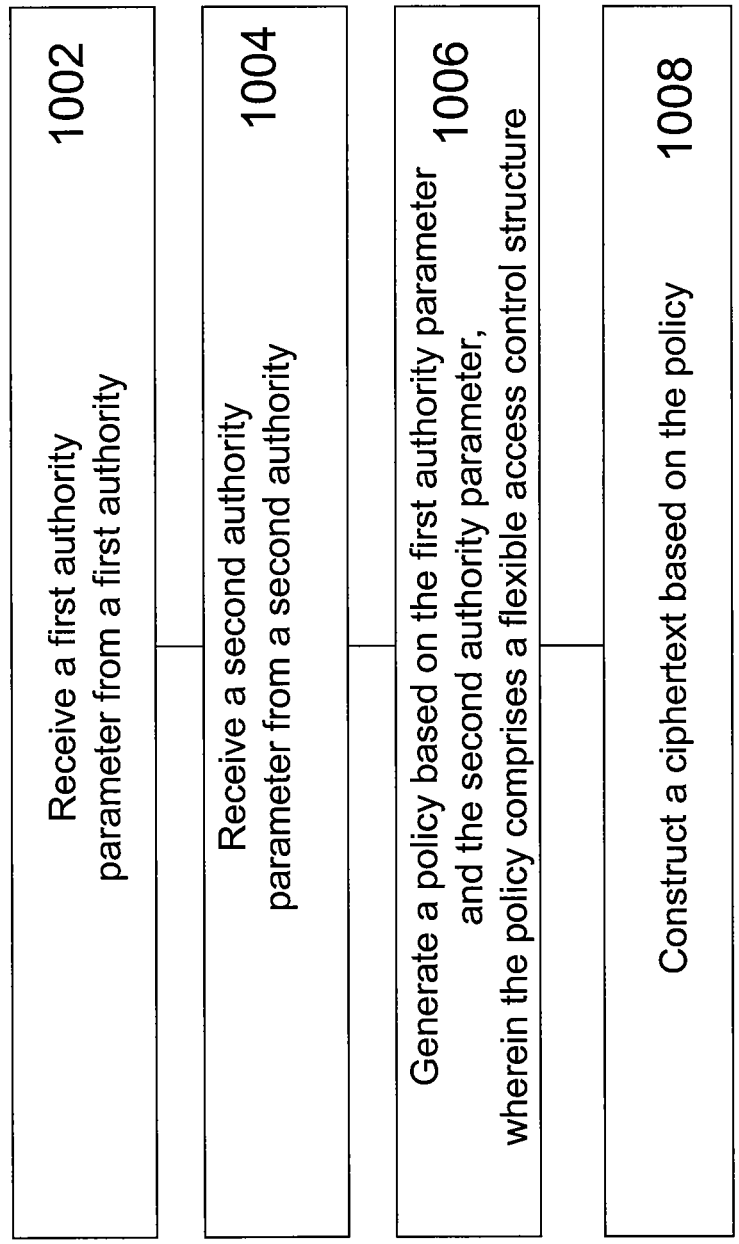
FIG. 10 shows a flow chart for encrypting a message in accordance with an embodiment.

FIG. 10 is a flow chart of a method for constructing a ciphertext in accordance with an embodiment. In an illustrative embodiment, authority 150 generates the first authority parameter by accessing a database such as database 304. The generated authority parameter may comprise an identifier of the first authority and a particular authority parameter for which the first authority has information. It should be noted that such authorities may provide authority parameters as a service in order to support secure data transmission in accordance with an embodiment. Suppose for example, that a user would like to encrypt a message and make that message readable to anyone who is currently an employee of a particular firm and who has at least five years of experience. In such an embodiment, an authority at the firm may publish that it can act as an authority with respect to information regarding current employees. When the user wishes to encrypt such a message, the user may contact an authority that has identified itself as an authority with respect to that information. An example of such an authority that has a list of all current employees may be an authority associated with the human resources department of the firm. The user may request an authority parameter from the authority that corresponds to the status of an individual as a current employee.

At step 1002, a first authority parameter is received from a first authority. In an exemplary embodiment, the first authority parameter is received at encryptor 210. The first authority parameter may be received from authority 150.

At step 1004, a second authority parameter is received from a second authority, for example authority 150-B. In an exemplary embodiment, the encryptor 210 may receive the second authority parameter from authority-B 260 or authority-C 270. Suppose, for example, that the user in an exemplary embodiment wishes to obtain a second authority parameter that corresponds to "clearance level." In such an example, the user may contact a second authority that has data regarding employee clearance levels at the particular firm to obtain a second authority parameter, where the second authority parameter corresponds to the level of security clearance of an employee.

At step 1006, a policy is generated based on the first authority parameter and the second authority parameter wherein the policy comprises a flexible access control structure. In the illustrative embodiment, the user generates a policy based on the first authority parameter and the second authority parameter. For example, such a policy might be represented by the formula:

Policy=((Employee=Yes) AND (Years of Experience>5)).

At step 1008 a ciphertext is constructed based on the policy as described below. In certain embodiments, a ciphertext may be constructed at encryptor 210. In certain embodiments a ciphertext may be generated at an authority such as authority-A 250 or at another entity in communication with encryptor 210. In the illustrative embodiment, the user generates the ciphertext, which is an encrypted version of the message, based on the policy.

Figure 11:
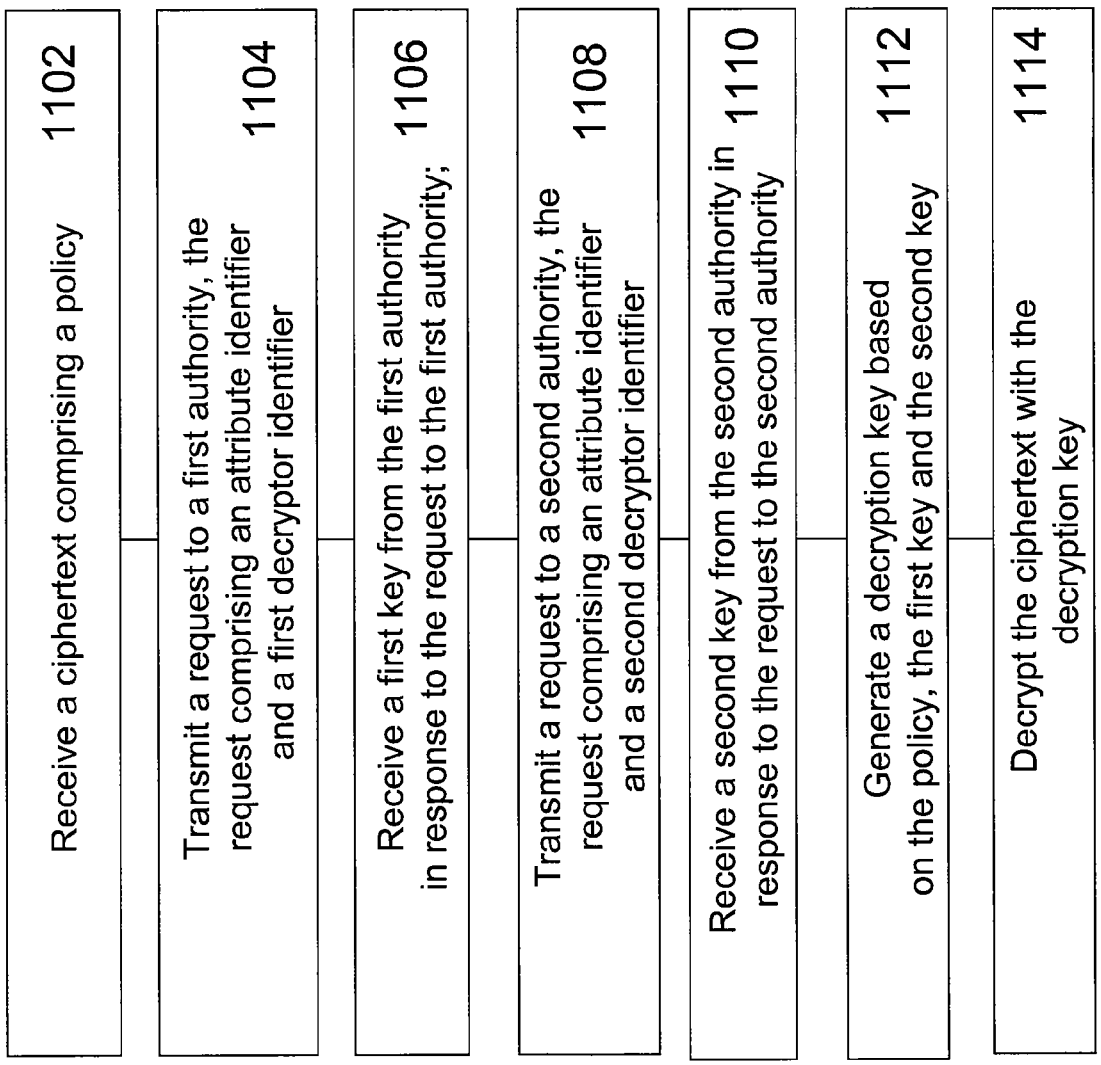
FIG. 11 shows a flow chart for decrypting a message in accordance with an embodiment.

FIG. 11 is a flow chart of a method for decrypting a ciphertext with a decryption key in accordance with an embodiment.

In an illustrative embodiment of a user decoding a message that has been encrypted in accordance with this disclosure, a ciphertext is received by a user who wishes to decrypt the ciphertext.

At step 1102 a ciphertext comprising a policy is received. In certain embodiments, a ciphertext is received by a decryptor such as decryptor 220. In the illustrative embodiment, the user receives the ciphertext via email or similar electronic means.

At step 1104 the decryptor determines whether he already has possession of the required key components to decrypt the ciphertext. If the decryptor determines that he does not have possession of the required key components, a request may be transmitted to a first authority, the request may comprise a first attribute identifier and a first decryptor identifier. For example, decryptor 220 may transmit a request to authority 150. In the illustrative embodiment, the user determines an attribute associated with a key component available from a first authority, where the key component may be used to decode the ciphertext. The user then sends information relating to that attribute along with the user's GID to an authority associated with that attribute. In certain embodiments, the user may send only a request including only a GID to an authority in order to request one or more keys that the authority associates with the GID.

At step 1106 a first key is received from the first authority in response to the request to the first authority. For example, decryptor 220 receives a key component to be used in decrypting the ciphertext from authority 150. In the illustrative embodiment, when the first authority determines that the user whose GID it received is eligible to receive the appropriate key component the authority sends the key component to the user.

At step 1108, if decryptor 220 does not have possession of the required key components associated with a second authority, a request may be transmitted to the second authority, the request comprising a second attribute identifier and a second decryptor identifier, which must be the same GID or resolve to the same GID used by the first authority. For example, decryptor 220 may send a request to authority 150 to obtain a second key component. In the illustrative embodiment, the user sends a request to the second authority to obtain a second key to be used in decrypting the ciphertext.

At step 1110 a second key is received from the second authority in response to the request to the second authority. For example, decryptor 220 receives the second key component from authority 150. In the illustrative embodiment, the user receives the second key component from a second authority.

At step 1112 a decryption key is generated based on the policy, the first key and the second key. For example, decryptor 220 generates a decryption key for the ciphertext based on the first key, the second key, and the policy. In the illustrative embodiment, the user combines the key components it has received with the policy in order to generate a decryption key for decrypting the ciphertext.

At step 1114, the ciphertext is decrypted with the decryption key. For example, decryptor 220 decrypts the ciphertext with the decryption key. In the illustrative embodiment, the user uses the decryption key to decrypt the ciphertext.

Figure 12:
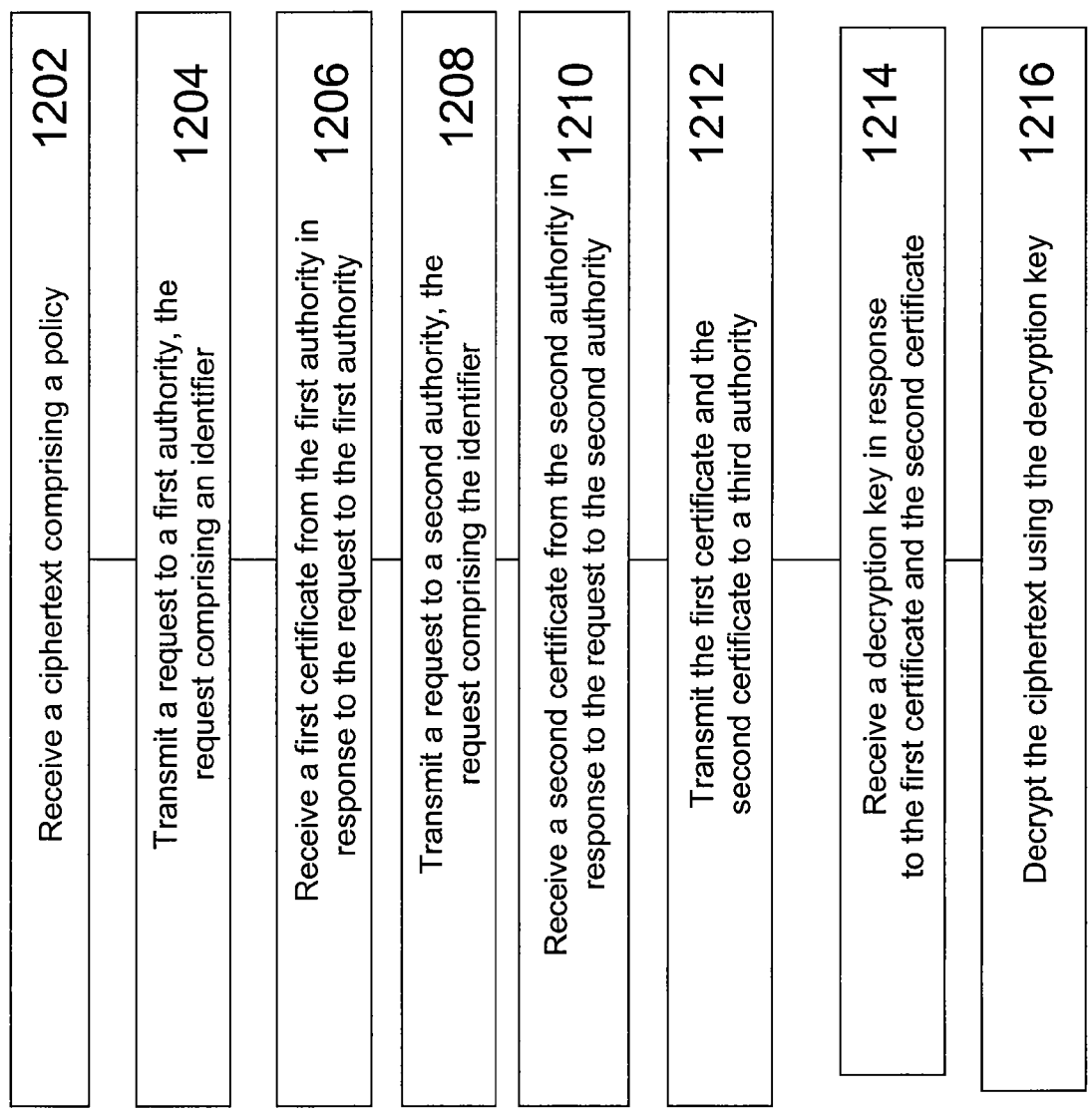
FIG. 12 shows a flow chart for decrypting a message in accordance with an embodiment.

FIG. 12 is a flow chart of a method for decrypting a ciphertext with a decryption key in accordance with an embodiment.

At step 1202 a ciphertext comprising a policy is received. For example, the ciphertext may be received at decryptor 220. At step 1204, a request may be transmitted to a first authority, the request comprising a decryptor identifier and optionally an attribute identifier or set of attribute identifiers. Alternatively, in certain embodiments, the decryptor may already have one or more certificates. In certain embodiments, when decryptor 220 does not have the required certificates, the request may be transmitted from decryptor 220 to an authority such as authority-A 250. At step 1206 a first certificate is received from the first authority in response to the request to the first authority. In certain embodiments, the first certificate may be received at decryptor 220 from authority 250-A.

At step 1208 a request is transmitted to a second authority, the request comprising a decryptor identifier and optionally an attribute identifier or set of attribute identifiers. In certain embodiments, the request may be transmitted from decryptor 220 to authority-B 260. At step 1210 a second certificate is received from the second authority in response to the request to the second authority. In certain embodiments, the first certificate may be received at decryptor 220 from authority 250-B. At step 1212 the first certificate and the second certificate are transmitted to a third authority. In certain embodiments, decryptor 220 may transmit a first certificate that was received from an authority such as authority 250-A and a second certificate that was received from an authority such as authority 250-B to a third authority such as authority 250-C, At step 1214, a decryption key is received in response to the first certificate and the second certificate. In certain embodiments, the decryption key may be received from the third authority. In certain embodiments, the decryption key may be received from another source based on the response of the third authority to the first certificate and the second certificate.

At step 1216, the ciphertext is decrypted with the decryption key. For example, decryptor 220 decrypts the ciphertext with the decryption key. In the illustrative embodiment, the user uses the decryption key to decrypt the ciphertext.

Figure 13:
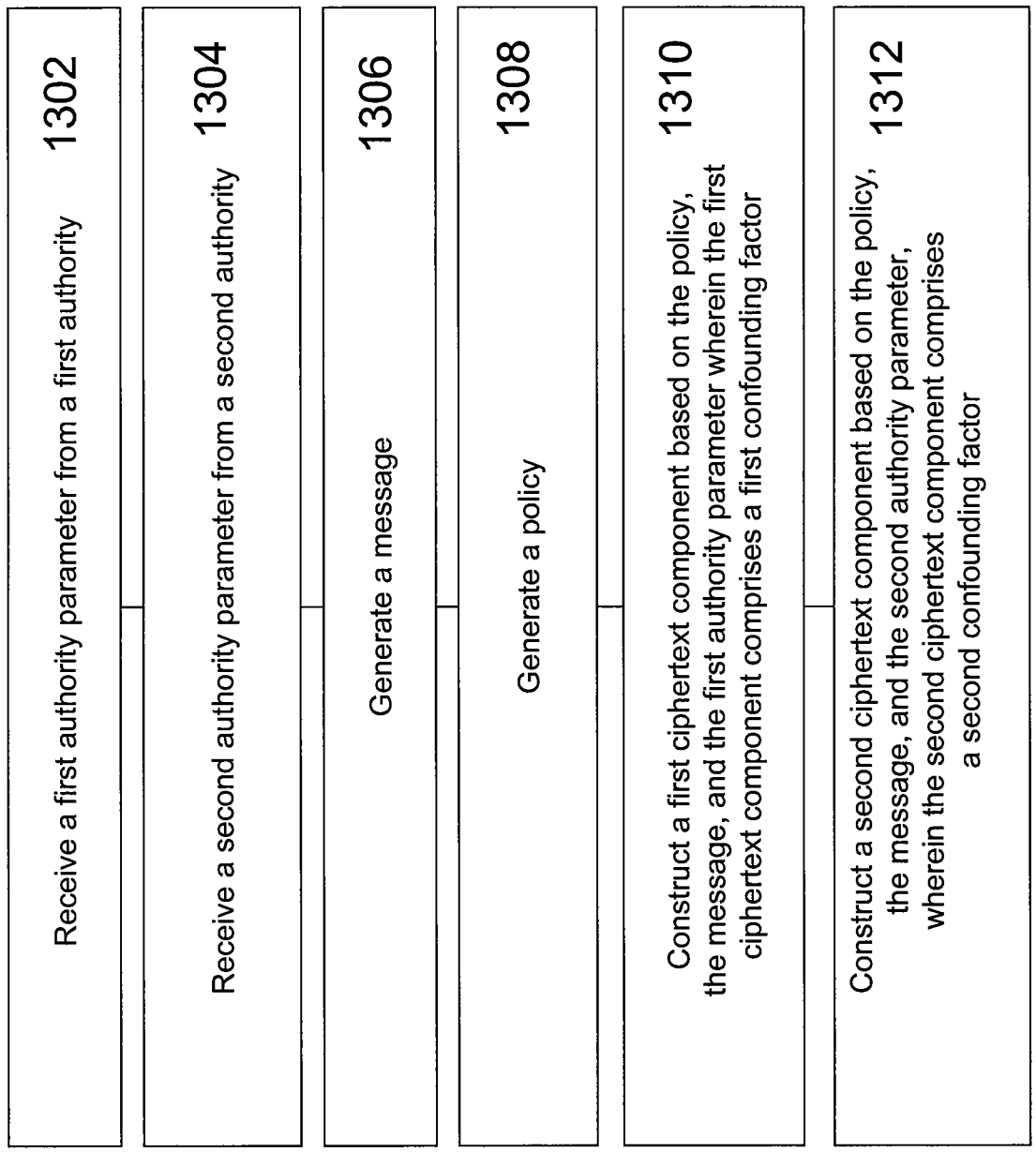
FIG. 13 shows a flow chart for encrypting a message in accordance with an embodiment.

FIG. 13 is a flow chart of a method for constructing a first ciphertext component and a second ciphertext component in accordance with an embodiment.

At step 1302 a first authority parameter is received from a first authority. For example, a first authority parameter may be received from authority 150-A at encryptor 210. At step 1304 a second authority parameter is received from a second authority. For example a second authority parameter may be received from authority 150-B at encryptor 210. At step 1306 a message is generated. For example, encryptor 210 may generate a message to be encrypted. At step 1308 a policy is generated. For example, encryptor 210 may generate a policy to be used in encrypting the message.

At step 1310 a first ciphertext component is constructed based on the policy, the message and the first authority parameter, wherein the first ciphertext component comprises a first confounding factor. For example, encryptor 210 may generate a first ciphertext component based on the policy, the message, and the first authority parameter received from authority-A 250. At step 1310 a second ciphertext component is constructed based on the policy, the message and the second authority parameter, wherein the second ciphertext component comprises a second confounding factor. For example, encryptor 210 may generate a second ciphertext component based on the policy, the message, and the second authority parameter received from authority-B 250. In an embodiment, one or more confounding factors may be used to blind the message and may be removed by the application of decryption keys satisfying the access control policy associated with the message. In certain embodiments the first and second confounding factors may be selected from a set of possible confounding factors or one or more of the confounding factors may be random numbers. A decryptor with a decryption key satisfying the encryption policy is able to combine the key with the ciphertext components in such a way that these confounding factors cancel themselves out. Once the confounding factors are removed, the components can be combined in such a way that the plaintext message is recoverable.

The following is a more mathematical description of attribute-based encryption in accordance with embodiments of the invention.

A bilinear group G of prime order p with generator g and a hash function that maps global identities to elements of G may be used as the global parameters, which all authorities would use to form their authority parameters, and as part of the key component generator 206 which generates decryption key components. In certain embodiments, encryptor 210 blinds a message M with blind:

$e(g,g)^s$, where s is a randomly chosen value in $Z_p$, in order to generate a ciphertext encoded with a particular policy. The value s is split into shares $\lambda_x$ according to the policy's access control structure, and the value 0 is split into shares $\omega_x$. The decryptor obtains a set of key components, each key component is associated with an attribute in the policy. In particular, the attributes in the policy are paired with the GID of the decryptor to generate attribute-identity pairs, in the foregoing these attribute-identity pairs are denoted (i,GID).

In order to decrypt the ciphertext, decryptor 220 recovers the blinding factor $e(g,g)^s$ by pairing the decryptor's key components for each pair of attribute-identity pair with the ciphertext elements to obtain the shares of s. In doing so, decryptor 220 introduces terms of the form $e(g,H(GID))^{\omega_x}$, where H is a hash function. If decryptor 220 has a set of keys that satisfy the policy and are each associated with the same identity GID, these additional terms cancel from the final result, since the $\omega_x$'s are shares of 0.

It should be noted that for a ciphertext generated in accordance an embodiment, the ciphertext is substantially secure against collusion attacks. Such a collusion attack is made when two "would be decryptors" each of whom satisfies a part of the policy attempt to decrypt the message by combining their attribute-identity pair information. When two entities with different identities GID and GID' attempt to collude and combine their keys to decrypt the ciphertext according to the above described method there will be some terms of the form $e(g,H(GID))^{\omega_x}$ and some terms of the form $e(g,H(GID'))^{\omega'_x}$. These terms will not cancel with each other in the decryption process, thereby preventing the recovery of the blind: $e(g,g)^s$.

In accordance with certain embodiments, a global setup step may take place prior to generating a ciphertext. In such a global setup generates global parameters ("GP"), the Global Setup(L)⇒ GP. Where the global parameters are a description of a bilinear group G of prime order p, the prime p, a generator g of G, and the description of a hash function H that maps global identities to elements of G. The GP may be chosen and published by one party of the system or computed through the cooperation of multiple parties.

In accordance with an embodiment, each authority may execute an authority setup step in order to create a secret key ("SK") and a authority parameter ("PK"), where Authority Setup(GP)⇒ (SK,PK). For each attribute i belonging to the authority, the authority chooses two random exponents $\alpha_i, y_i \in Z_p$. It publishes $PK=\{e(g,g)^{\alpha_i}, g^{y_i}\}_i$ as its authority parameter and keeps $SK=\{\alpha_i, y_i\}_i$ as its secret key.

In accordance with an embodiment, an encryptor 210 may perform an encryption function to generate a ciphertext such as:

Encrypt($M,(A,\rho),GP,\{PK_j\}$)⇒ $CT$.

Encryptor 210 may have a plaintext message M, a flexible access control policy that may be represented as an n×l access matrix A with ρ mapping its rows to attributes, the global parameters GP, and the authority parameters of the relevant authorities $\{PK_j\}$. The encryptor may then choose a random $s \in Z_p$ and a random vector $v \in Z_p^l$ with s as its first entry. In the following, $\lambda_x$ denotes $A_x \cdot v$, where $A_x$ is row x of A. The encryptor may also choose a random vector $w \in Z_p^l$ with 0 as its first entry. In the following $\omega_x$ denotes $A_x \cdot w$. For each row $A_x$ of A, it chooses a random $r_x \in Z_p$. Thus the encryption of M may be computed as:

$C_0 = Me(g,g)^s$, $C_{1,x} = e(g,g)^{\lambda_x} e(g,g)^{\alpha_{\rho(x)} r_x}$, $C_{2,x} = g^{r_x}$, $C_{3,x} = g^{y_{\rho(x)} r_x} g^{\omega_x}$ for all x where x are the indices of rows of A.

Keys and key components may be generated by authority 150 based on a global identifier of decryptor 220, global parameters, the shares and the secret key for the particular authority generating the key.

KeyGen(GID,GP,i,SK) ⇒ $K_{i,GID}$.

To create a key for GID for attribute i belonging to an authority, the authority computes $K_{i,GID} = g^{\alpha_i} H(GID)^{y_i}$.

To decrypt such a message, decryptor 220 performs a decrypt function:

Decrypt(CT,GP,$\{K_{i,GID}\}$) ⇒ M.

Decryptor 220 verifies that the ciphertext is properly encrypted under some access structure (A,ρ) and outputs an error message if it is not. To decrypt, the data receiver first computes H(GID). If decryptor 220 has the secret keys $\{K_{\rho(x),GID}\}$ for a subset of rows $A_x$ of A such that (1, 0, . . . , 0) is in the span of these rows, then the receiver proceeds as follows. For each such x, decryptor 220 computes:

$C_{1,x} \cdot e(H(GID), C_{3,x}) / e(K_{\rho(x),GID}, C_{2,x}) = e(g,g)^{\lambda_x} e(H(GID), g)^{\omega_x}$.

Decryptor 220 then chooses constants $c_x \in Z_p$ such that $$\sum_x c_x A_x = (1, 0, \ldots, 0)$$

and computes:

$$\prod_x (e(g,g)^{\lambda_x} e(H(GID), g)^{\omega_x})^{c_x} = e(g,g)^s.$$

(Recall that $\lambda_x = A_x \cdot v$ and $\omega_x = A_x \cdot w$, where $v \cdot (1, 0, \ldots, 0) = s$ and $w \cdot (1, 0, \ldots, 0) = 0$.)

Decryptor 220 may then obtain the plaintext version of the message by computing the value of:

$M = C_0 / e(g,g)^s$.

In an embodiment, a policy associated with a ciphertext may be represented as an access structure. For example, for a particular access structure, there may be certain embodiments where $\{P_1, \ldots, P_n\}$ are a set of parties. A collection of parties $A \subset 2^{\{P_1, \ldots, P_n\}}$ is monotone if for all B, C: if B ∈ A and B ⊂ C, then C ∈ A. An access structure (respectively, monotone access structure) is a collection (respectively, monotone collection) A of non-empty subsets of $\{P_1, \ldots, P_n\}$, i.e., A ⊂ $2^{\{P_1, \ldots, P_n\}} \setminus \{\}$. The sets in A are called the authorized sets, and the sets not in A are called the unauthorized sets.

In certain embodiments, attributes may play the role of parties in the collection of parties referred to above.

Certain embodiments of the disclosure will employ a linear secret-sharing scheme (LSSS) to represent a policy. In an embodiment, a secret sharing scheme Π over a set of parties P is called linear (over $Z_p$) if 1) The shares for each party form a vector over $Z_p$.
2) There exists a matrix A called the share-generating matrix for Π.

Where the matrix A has l rows and n columns. For all x=1, . . . , l, the x th row of A is labeled by a party ρ(x) (ρ is a function from $\{1, \ldots, l\}$ to P). When we consider the column vector $v = (s, r_2, \ldots, r_n)$, where $s \in Z_p$ is the secret to be shared and $r_2, \ldots, r_n \in Z_p$ are randomly chosen, then Av is the vector of l shares of the secret s according to Π. The share $(Av)_x$ belongs to party ρ(x).

Note that such a secret sharing scheme has a linear reconstruction property: In an embodiment where Π is an LSSS for access structure B. S may denote an authorized set, and define $I \subset \{1, \ldots, l\}$ as I=$\{x : \rho(x) \in S\}$. In such an embodiment, there exist constants $\{\omega_x \in Z_p\}_{x \in I}$ such that, for any valid shares $\{\lambda_x\}$ of a secret s according to Π, we have:

$$\sum_{x \in I} \omega_x \lambda_x = s.$$

These constants $\{\omega_x\}$ can be calculated in polynomial time with respect to the size of the share-generating matrix A.

In certain embodiments key components may be generated by and received from multiple authorities. In such embodiments, each of the authorities may generate its own parameters and keys. Furthermore, in an embodiment, the authorities may generate components of policies comprising AND, OR, and NOT gates which may be provided to encryptor 210. In certain embodiments in which there are one or more authorities (e.g. 150-A, 150-B, 150-C, etc.) from which key components are received, the one or more authorities may not communicate with each other. For example, in certain embodiments in which respective key components are received from a first authority 150-A and a second authority 150-B, the first authority and the second authority may not communicate.

In some embodiments there may be a central authority. In other embodiments there may be no central authority in the system. In some embodiments of the system a plurality of authorities may collaborate in generating parameters prior to or during the scheme setup.

In some embodiments, there may be an encryption scheme that uses bilinear maps. In some embodiments, a separate algorithm may be used for global setup of the system and for the setup of each authority in the system. In some embodiments bilinear groups associated with the bilinear maps may be of prime order q. In some embodiments, the bilinear groups associated with the bilinear maps may be of composite order.

In some embodiments a global identifier ("GID") may be used. The GID may be accessible to a global authority or authorities, but not available to the certain other authorities in some embodiments. In an embodiment where a GID is not available to a particular authority that from whom a key component is requested, the particular authority may have a means to translate GID to another identifier in order to generate a key component.

In some embodiments, a private key generator may be implemented inside of a hardware security module. In some embodiments, secret keys may be kept on smart cards. In some embodiments, public authority parameters may be signed by a certificate authority.

In various embodiments, the method steps described herein, including the method steps described in FIGS. 7, 8, 9, 10, 11, 12, and 13, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. For example in an embodiment, either or both of encryptor 210 and decryptor 220 may act as a client with respect to authority 150 which may act as a server with respect to client devices. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 7, 8, 9, 10, 11, 12, and 13. Alternatively, for example, the client or clients may transmit a request adapted to cause a server computer or computers to perform one or more of the method steps described herein, including one or more of the steps of FIGS. 7, 8, 9, 10, 11, 12, and 13. Certain steps of the methods described herein, including one or more of the steps of FIGS. 7, 8, 9, 10, 11, 12, and 13, may be performed by a server or by another processor in a network-based cloud-computing system. Certain steps of the methods described herein, including one or more of the steps of FIGS. 7, 8, 9, 10, 11, 12, and 13, may be performed by a client computer in a network-based cloud computing system. The steps of the methods described herein, including one or more of the steps of FIGS. 7, 8, 9, 10, 11, 12, and 13, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 7, 8, 9, 10, 11, 12, and 13, may be implemented using one or more computer programs that are executable by such a processor. A computer program is a set of computer program instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Figure 14:
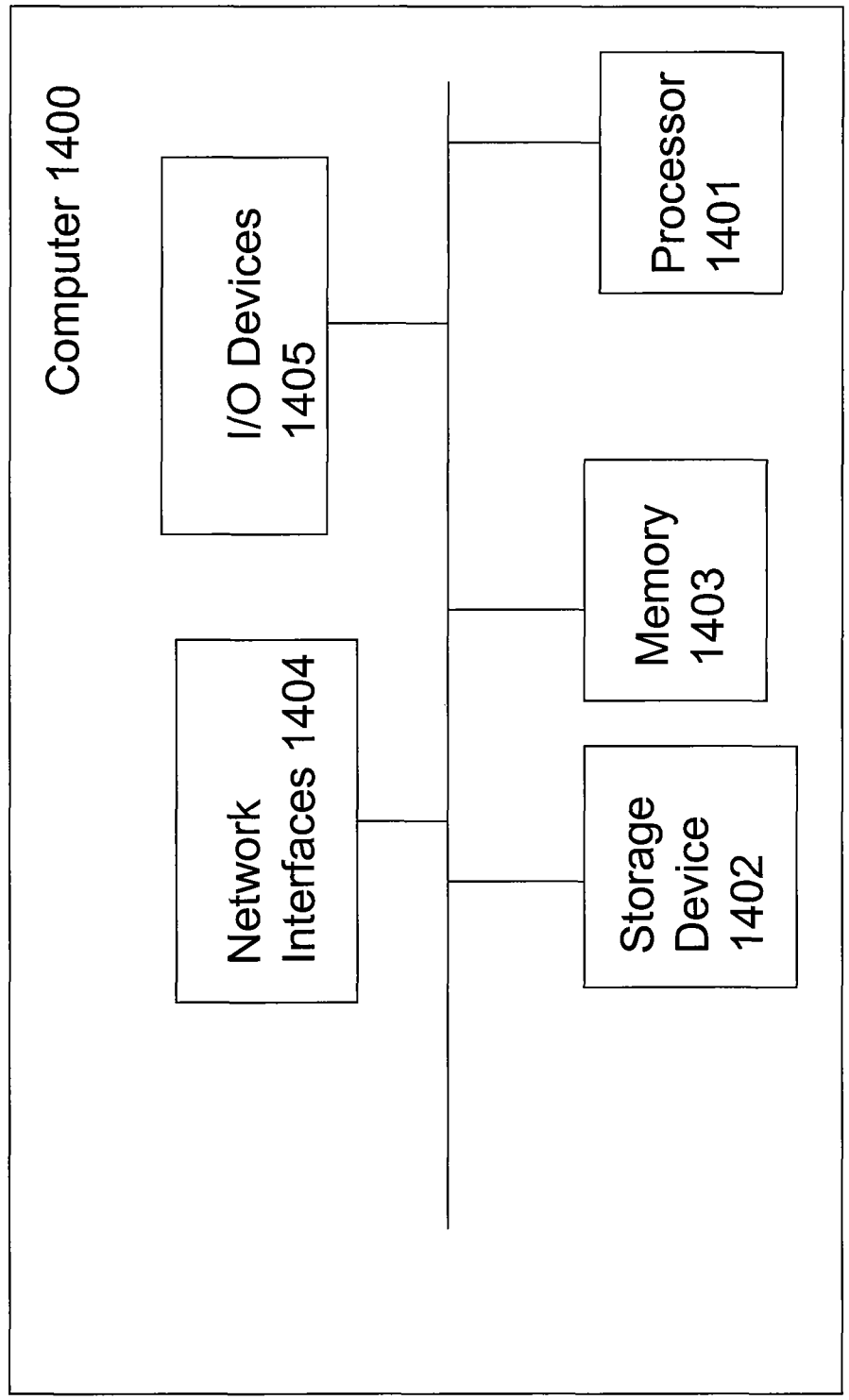
FIG. 14 shows components of an exemplary computer that may be used to implement the system described herein.

A high-level block diagram of an exemplary computer that may be used to implement systems, apparatus and methods described herein is illustrated in FIG. 14. Computer 1400 comprises a processor 1401 operatively coupled to a data storage device 1402 and a memory 1403. Processor 1401 controls the overall operation of computer 1400 by executing computer program instructions that define such operations. The computer program instructions may be stored in data storage device 1402, or other computer readable medium, and loaded into memory 1403 when execution of the computer program instructions is desired. Thus, the method steps of FIGS. 7, 8, 9, 10, 11, 12, and 13 may be defined by the computer program instructions stored in memory 1403 and/or data storage device 1402 and controlled by the processor 1401 executing the computer program instructions. For example, the computer program instructions may be implemented as computer executable code programmed by one skilled in the art to perform an algorithm defined by the method steps of FIGS. 7, 8, 9, 10, 11, 12, and 13. Accordingly, by executing the computer program instructions, the processor 1401 executes an algorithm defined by the method steps of FIGS. 7, 8, 9, 10, 11, 12, and 13. Computer 1400 also includes one or more network interfaces 1404 for communicating with other devices via a network. Computer 1400 also includes one or more input/output devices 1405 that enable user interaction with computer 1400 (e.g., display, keyboard, mouse, speakers, buttons, etc.).

Processor 1401 may include both general and special purpose microprocessors, and may be the sole processor or one of multiple processors of computer 1400. Processor 1401 may comprise one or more central processing units (CPUs), for example. Processor 1401, data storage device 1402, and/or memory 1403 may include, be supplemented by, or incorporated in, one or more application-specific integrated circuits (ASICs) and/or one or more field programmable gate arrays (FPGAs).

Data storage device 1402 and memory 1403 each comprise a tangible non-transitory computer readable storage medium. Data storage device 1402, and memory 1403, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1405 may include peripherals, such as a printer, scanner, display screen, etc. For example, input/output devices 1405 may include a display device such as a cathode ray tube (CRT) or liquid crystal display (LCD) monitor for displaying information to the user, a keyboard, and a pointing device such as a mouse or a trackball by which the user can provide input to computer 1400.

Any or all of the systems and apparatus discussed herein, including parties such as authority 150, encryptor 210, decryptor 220, and components thereof, may be implemented using a computer such as computer 1400.

One skilled in the art will recognize that an implementation of an actual computer or computer system may have other structures and may contain other components as well, and that FIG. 14 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the disclosure.

The invention claimed is:

1. A computerized method comprising:
   receiving by a computerized processor a first authority parameter from a first authority;
   receiving by a computerized processor a second authority parameter from a second authority;
   generating by a computerized processor a policy based on the first authority parameter and the second authority parameter, wherein the policy comprises a flexible access control structure; and
   constructing a ciphertext based on the policy,
   wherein the first authority parameter is distinct from the second authority parameter, and
   wherein the flexible access control structure comprises at least one threshold operator between distinct authority parameters, and at least one AND operator between distinct authority parameters.

2. A computerized method comprising:
   receiving by a computerized processor a first authority parameter from a first authority;
   receiving by a computerized processor a second authority parameter from a second authority;
   generating by a computerized processor a policy based on the first authority parameter and the second authority parameter, wherein the policy comprises a flexible access control structure; and
   constructing a ciphertext based on the policy,
   wherein the first authority parameter is distinct from the second authority parameter, and
   wherein the flexible access control structure comprises at least one OR operator between distinct authority parameters, and at least one AND operator between distinct authority parameters.

3. A computerized method comprising:
   receiving by a computerized processor a ciphertext comprising a policy;
   transmitting a request to a first authority, the request comprising a first attribute identifier and a first decryptor identifier;
   receiving by a computerized processor a first key from the first authority in response to the request to the first authority;
   transmitting a request to a second authority, the request comprising a second attribute identifier and a second decryptor identifier;
   receiving by a computerized processor a second key from the second authority in response to the request to the second authority;
   generating by a computerized processor a decryption key based on the policy, the first key and the second key; and
   decrypting by a computerized processor the ciphertext with the decryption key.

4. The method of claim 3, wherein transmitting the request to the first authority occurs prior to receiving the ciphertext.

5. The method of claim 3, wherein the generation of the plaintext is based on whether the first decryptor identifier is the same as the second decryptor identifier.

6. The method of claim 3, wherein the first decryptor identifier comprises a variable-length string of bits.

7. The method of claim 3, wherein the first attribute identifier comprises a textual or numerical identifier.

8. The method of claim 4, wherein the textual or numerical identifier comprises one of:
   a name, an organizational role, an email address, a phone number, a social security number, a date, a time or an event.

9. The method of claim 3, further comprising:
   storing the decryption key on a smartcard or a tamper-resistant device.

10. The method of claim 3, wherein receiving the first key from the first authority further comprises:
    conducting a verification operation on the first decryptor identifier and the first attribute identifier; and
    determining whether to return a key based on the verification operation.

11. A computerized method comprising:
    receiving by a computerized processor a ciphertext comprising a policy;
    transmitting a request to a first authority, the request comprising an identifier;
    receiving by a computerized processor a first certificate from the first authority in response to the request to the first authority;
    transmitting a request to a second authority, the request comprising the identifier;
    receiving by a computerized processor a second certificate from the second authority in response to the request to the second authority;
    transmitting the first certificate and the second certificate to a third authority;
    receiving by a computerized processor a decryption key in response to the first certificate and the second certificate; and
    decrypting by a computerized processor the ciphertext using the decryption key.

12. A computerized encryption method comprising:
    receiving by a computerized processor a first authority parameter from a first authority;
    receiving by a computerized processor a second authority parameter from a second authority;
    generating by a computerized processor a message;
    generating by a computerized processor a policy;

constructing a first ciphertext component based on the policy, the message, and the first authority parameter, wherein the first ciphertext component comprises a first confounding factor;

constructing a second ciphertext component based on the policy, the message, and the second authority parameter, wherein the second ciphertext component comprises a second confounding factor;

generating by a computerized processor a ciphertext based on the first ciphertext component and the second ciphertext component; and decrypting by a computerized processor the ciphertext, where decrypting the ciphertext causes the first confounding factor to cancel out the second confounding factor.

* * * * *